(12) United States Patent
Smith

(10) Patent No.: US 11,661,368 B2
(45) Date of Patent: May 30, 2023

(54) METHOD AND APPARATUS FOR SHAPING A GLASS SHEET

(71) Applicant: Pilkington Group Limited, Lancashire (GB)

(72) Inventor: Simon Colin Smith, Lancashire (GB)

(73) Assignee: PILKINGTON GROUP LIMITED, Lancashire (GB)

( * ) Notice: Subject to any disclaimer, the term of this patent is extended or adjusted under 35 U.S.C. 154(b) by 572 days.

(21) Appl. No.: 16/615,238

(22) PCT Filed: Jun. 1, 2018

(86) PCT No.: PCT/GB2018/051504
§ 371 (c)(1),
(2) Date: Nov. 20, 2019

(87) PCT Pub. No.: WO2018/220394
PCT Pub. Date: Dec. 6, 2018

(65) Prior Publication Data
US 2020/0156985 A1    May 21, 2020

(30) Foreign Application Priority Data
Jun. 1, 2017 (GB) .................................... 1708761

(51) Int. Cl.
*C03B 23/03* (2006.01)
*C03B 35/16* (2006.01)

(52) U.S. Cl.
CPC ........ *C03B 23/0305* (2013.01); *C03B 35/161* (2013.01)

(58) Field of Classification Search
CPC ................................................. C03B 23/0305
See application file for complete search history.

(56) References Cited

U.S. PATENT DOCUMENTS 4,265,652 A * 5/1981 Goto .................. C03B 23/0302
65/273
4,853,012 A 8/1989 Batteux et al.
(Continued)

FOREIGN PATENT DOCUMENTS

CN           1714054 A    12/2005
CN         101720308 A     6/2010
(Continued)

OTHER PUBLICATIONS

Office Action (Notification of the First Office Action) dated Dec. 10, 2021, by the China National Intellectual Property Administration in corresponding Chinese Patent Application No. 201880035219.1 and an English Translation of the Office Action. (27 pages).
(Continued)

*Primary Examiner* — Erin Snelting
(74) *Attorney, Agent, or Firm* — Buchanan Ingersoll & Rooney PC

(57) ABSTRACT

Methods of shaping a glass sheet include providing a shaping support for supporting the glass sheet; providing a press bending apparatus comprising at least a first and a second mould member, each mould member being movable relative to the shaping support; heating the glass sheet; positioning the glass sheet on the shaping support; moving at least one of the shaping support and the press bending apparatus toward the other to press the glass sheet in a first region thereof between the shaping support and the first mould member; moving the second mould member relative to the first mould member to press the glass sheet in a second region thereof, and moving the first mould member relative to the shaping support to further press the glass sheet in the first region thereof between the first mould member and the shaping support. Apparatus useful to carry out the methods is also described.

13 Claims, 13 Drawing Sheets

(56) References Cited

U.S. PATENT DOCUMENTS

| | | | |
|---|---|---|---|
| 4,973,344 A | * | 11/1990 | Rahrig .................. C03B 23/03 65/351 |
| 5,122,177 A | | 6/1992 | Yoshizawa et al. |
| 5,401,286 A | | 3/1995 | Goolsbay et al. |
| 2004/0226318 A1 | | 11/2004 | Schwartz et al. |
| 2007/0157671 A1 | | 7/2007 | Thellier et al. |
| 2007/0286783 A1 | | 12/2007 | Carrette et al. |
| 2015/0000340 A1 | | 1/2015 | Jang et al. |
| 2015/0007612 A1 | | 1/2015 | King et al. |
| 2015/0274570 A1 | | 10/2015 | Wada et al. |
| 2017/0341969 A1 | | 11/2017 | Chau et al. |

FOREIGN PATENT DOCUMENTS

| | | |
|---|---|---|
| CN | 104445888 A | 3/2015 |
| EP | 0537593 A1 | 4/1993 |
| EP | 3078642 A1 | 10/2016 |
| JP | S55-164333 U | 11/1980 |
| JP | S638229 A | 1/1988 |
| JP | H03-208824 A | 9/1991 |
| JP | 2007-506637 A | 3/2007 |
| KR | 20150048450 A | 5/2015 |
| WO | 2005000026 B1 | 3/2005 |
| WO | 2005033026 A1 | 4/2005 |
| WO | 2009002375 A1 | 12/2008 |
| WO | 2012166365 A1 | 12/2012 |

OTHER PUBLICATIONS

English Translation of the Office Action (Notification of Reasons for Refusal) dated Feb. 1, 2022, by the Japanese Patent Office in corresponding Japanese Patent Application No. 2019-565562. (5 pages).

International Search Report and Written Opinion issued in corresponding International Patent Application No. PCT/GB2018/051504, 12 pages (dated Aug. 21, 2018).

Search Report issued in corresponding Great Britain Patent Application No. GB1708761.0, 6 pages (dated Dec. 1, 2017).

* cited by examiner

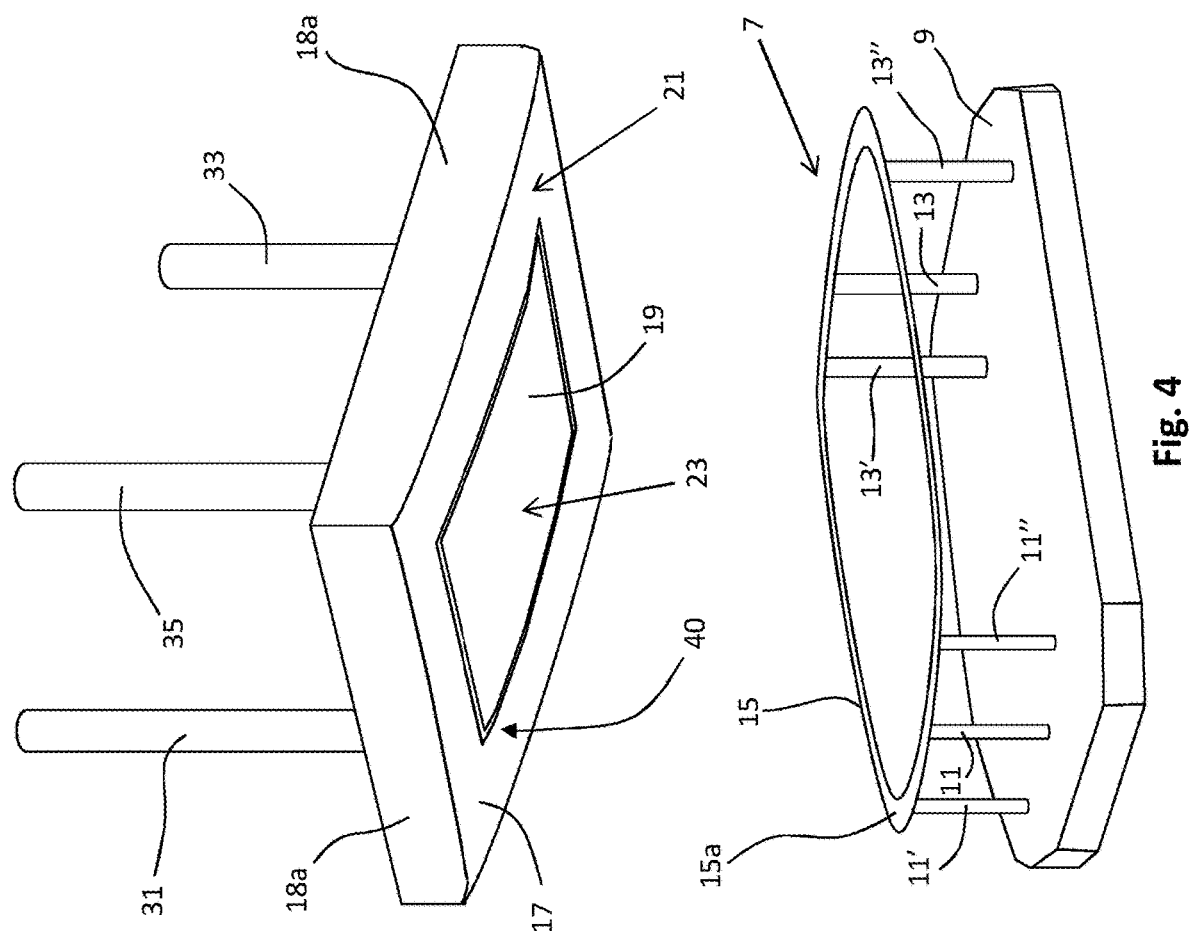
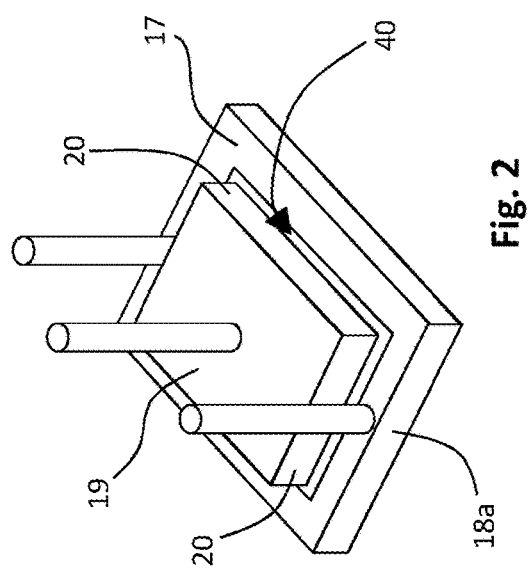
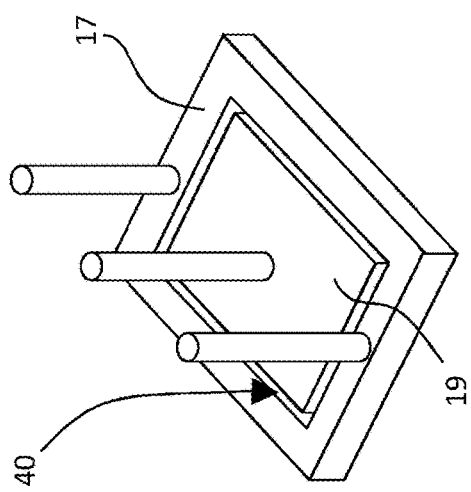

METHOD AND APPARATUS FOR SHAPING A GLASS SHEET

The present invention relates to a method of shaping a glass sheet and to an apparatus for shaping a glass sheet.

It is well known in the art to bend or shape a flat glass sheet between a pair of shaping members having complementary shaping surfaces. Typically a heat softened glass sheet is supported on a ring mould and is bent between the ring mould and an upper unitary full surface mould.

US2015/0000340A1 relates to an apparatus for forming glass, the apparatus including a lower mold, a fixing mold and an upper mold. Similar art in the display glass field includes KR10-2015-0048450A and US2015/0274570A1.

JPS638229A relates to molding plate glass into a hollow article of ultrathin glass having a smooth surface and stable dimensions by fixing moldably heated glass to a guide ring, pressing a plunger against the glass and forcing the glass into an open part.

U.S. Pat. No. 5,401,286 relates to a flexible ring mold for shaping heat softened glass sheets wherein an inner ring having a plurality of posts which help support the ring mold and maintain the molds generally planar configuration during the initial lifting and shaping of a supported glass sheet is provided.

A press bending station is described in WO2005/033026A1 that includes an annular mould and a full-face mould. Holes, selectively connected to a negative pressure source, are placed in portions of the full face mould that are determined by the configuration of the annular mould when the annular mould comes into contact with a heated glass sheet during the press bending process. The heated glass sheet is drawn by negative pressure through the holes towards the full-face mould and thus acquires its shape. The full-face mould may be covered by at least one fine mesh cloth i.e. woven stainless steel.

For manufacturing certain complex bent glass shapes which may have particular use as a pane in a vehicle window, it is sometimes not possible to bend the glass to the desired shape using a unitary press bending member. It has been found for certain shapes using a unitary press bending member, portions of the glass edge buckle during the press bending operation leading to a wrinkle in the edge of the glass that produces at least an optical distortion.

In the prior art this type of problem can be overcome by supporting the glass sheet on a lower ring mould and using an upper press bending member that is made from more than one moving part as described in U.S. Pat. No. 5,122,177. It is described in U.S. Pat. No. 5,122,177 how the edge of the glass sheet to be bent is supported on a shaping frame, the glass sheet being first clamped at the peripheral edges thereof, following which the central region of the glass sheet is pressed to the desired curvature.

A similar two part mould is described in US2015/0007612A1.

However it has been found that when using such a two part press bending member as described in the prior art, for certain desired bent glass shapes the press bending operation may introduce very high stresses in the glass sheet during the bending operation such that the glass sheet may break whilst being shaped.

The present invention aims to at least partially overcome the above problem.

Accordingly from a first aspect the present invention provides a method of shaping a sheet of glass comprising the steps: (i) providing a shaping support for supporting the glass sheet; (ii) providing a press bending apparatus comprising at least two (a first and a second) mould members, each of the first and second mould members being movable relative to the shaping support; (iii) heating the glass sheet; (iv) positioning the glass sheet on the shaping support; (v) moving at least one of the shaping support and the press bending apparatus toward the other to press the glass sheet in a first region thereof between the shaping support and the first mould member; (vi) moving the second mould member relative to the first mould member to press the glass sheet in a second region thereof, and (vii) moving the first mould member relative to the shaping support to further press the glass sheet in the first region thereof between the first mould member and the shaping support.

For the avoidance of doubt, the first mould member is movable relative to the shaping support, the second mould member is movable relative to the shaping support and the first mould member is movable relative to the second mould member.

During step (v) the glass sheet is pressed between the shaping support and the first mould member with sufficient force to allow the second mould member to press bend the glass sheet during step (vi), but in step (v) the first mould member is not in the final position relative to the shaping support to provide the glass sheet with the final desired curvature in the first region thereof.

During step (vii) the glass sheet is pressed between the shaping support and the first mould member to provide the glass sheet with the final desired curvature in the first region thereof.

It has been found that by only partially clamping the first region of the glass sheet during step (v), the addition of step (vii) to further press the glass sheet in the first region between the first mould member and the shaping support reduces the amount of glass breakage during the shaping process.

Preferably prior to step (v) the press bending apparatus is configured such that prior to step (v) or during step (v), the press bending apparatus does not contact the glass sheet in the second region thereof.

Preferably prior to step (v) or during step (v), the press bending apparatus contacts the glass sheet in the second region thereof. In particular, preferably prior to step (v) or during step (v), the second mould member contacts the glass sheet in the second region thereof.

Preferably during step (vii), the second mould member is also moved relative to the shaping support to further press bend the glass sheet in the second region thereof. When the second mould member is moved relative to the shaping support during step (vii), the second mould member may also move relative to the first mould member.

Preferably when the second mould member is moved relative to the shaping support during step (vii) the movement of the first and second mould members relative to the shaping support is synchronised.

Preferably the first region of the glass sheet is a peripheral region of the glass sheet. Preferably the peripheral region extends around the entire perimeter of the glass sheet.

Preferably the second region of the glass sheet is a central region of the glass sheet.

Preferably the first region of the glass sheet is a peripheral region of the glass sheet, in particular a peripheral region that extends around the entire perimeter of the glass sheet, and the second region of the glass sheet is a central region of the glass sheet, the central region of the glass sheet being inboard of the peripheral region of the glass sheet.

Preferably the shaping support comprises at least one rail for supporting the glass sheet about a peripheral region thereof. Preferably the shaping support is a ring-type female mould for supporting the glass sheet in a peripheral region.

Preferably during step (v), the glass sheet is pressed between the first mould member and the shaping support in a peripheral region. When the shaping support comprises at least one rail for supporting the glass sheet about a peripheral region thereof, it is preferred that during step (v), the glass sheet is pressed between the first mould member and the at least one shaping rail of the shaping support in the peripheral region of the glass sheet.

Preferably during step (vi), the glass sheet is pressed in a central region thereof whilst the glass sheet is pressed between the first mould member and the shaping support. When the shaping support comprises at least one rail for supporting the glass sheet about a peripheral region thereof, it is preferred that during step (vi), the glass sheet is pressed in a central region thereof whilst the glass sheet is pressed between the first mould member and the at least one shaping rail of the shaping support.

Preferably the first mould member has a shaping surface and the glass sheet faces the shaping surface of the first mould member during step (v). Preferably the first mould member has at least one opening in the shaping surface thereof, the at least one opening in the shaping surface of the first mould member being in fluid communication with at least one vacuum source, the at least one vacuum source being operable to provide at least one negative pressure region at a portion of the first region of the glass sheet after step (vii). The at least one vacuum source in fluid communication with the at least one opening in the shaping surface of the first mould member may also be used to provide at least one negative pressure region at a portion of the first region of the glass sheet during at least one of the steps (v), (vi) and (vii). The at least one opening in the shaping surface of the first mould member may also be in fluid communication with a fluid source, for example compressed air, such that following the provision of at least one negative pressure region at a portion of the first region of the glass sheet after step (vii), fluid may be caused to flow through the at least one opening in the shaping surface of the first mould member.

Preferably the second mould member has a shaping surface and the glass sheet faces the shaping surface of the second mould member during step (vi). Preferably the second mould member has at least one opening in the shaping surface thereof, the at least one opening in the shaping surface of the second mould member being in fluid communication with at least one vacuum source, the at least one vacuum source being operable to provide at least one negative pressure region at a portion of the second region of the glass sheet after step (vii). The at least one vacuum source in fluid communication with the at least one opening in the shaping surface of the second mould member may also be used to provide at least one negative pressure region at a portion of the second region of the glass sheet during at least one of the steps (v), (vi) and (vii). The at least one opening in the shaping surface of the second mould member may also be in fluid communication with a fluid source, for example compressed air, such that following the provision of at least one negative pressure region at a portion of the second region of the glass sheet after step (vii), fluid may be caused to flow through the at least one opening in the shaping surface of the second mould member.

Preferably the press bending apparatus is configured such there is at least one (a first) gap between the first and second mould members. Preferably the first gap is in fluid communication with at least one vacuum source, the at least one vacuum source being operable being operable to provide at least one negative pressure region at a portion of the glass sheet opposite the first gap, the portion of the glass sheet opposite the first gap being between the first and second regions of the glass sheet. The first gap may also be in fluid communication with a fluid source, for example compressed air, such that following the provision of at least one negative pressure region at a portion of the glass sheet opposite the first gap after step (vii), fluid may be caused to flow through the first gap.

By using negative pressure to one or more selected regions of the glass during the glass bending, the glass bending process may be improved as described for example in WO2005000026A1 and WO2009002375A1. Typically following the provision of negative pressure to one or more selected regions of the glass during the glass bending, after the source of negative pressure is terminated, air i.e. compressed air, is blown through openings in the shaping surface in contact with the glass sheet to assist with the removal of the glass sheet from said shaping surface.

Preferably the first mould member has a shaping surface with at least one opening therein and the second mould member has a shaping surface with at least one opening therein, there being at least one vacuum source in fluid communication with the at least one opening in the shaping surface of the first mould member and the at least one opening in the shaping surface of the second mould member, and wherein following step (vii) the at least one vacuum source is used to provide at least one negative pressure region at a portion of the first region of the glass sheet and at least one negative pressure region at a portion of the second region of the glass sheet.

Preferably the first mould member has a mould member cover such that during step (v) the mould member cover of the first mould member is between the first mould member and the glass sheet. Preferably the mould member cover of the first mould member comprises a cloth, more preferably an air permeable cloth. Preferably the cloth comprises at least one of stainless steel, fibre glass, poly para-phenyleneterephthalamide fibres or blends thereof, polybenzoxazole (PBO) fibres containing graphite, and various weaves of these fibres. Usually when the first mould member has a mould member cover, the mould member cover of the first mould member is between the first mould member and the glass sheet during steps (v), (vi) and (vii).

Preferably the second mould member is provided with a mould member cover such that during step (v) the mould member cover of the second mould member is between the second mould member and the glass sheet. Preferably the mould member cover of the second mould member comprises a cloth, more preferably an air permeable cloth. Preferably the cloth comprises at least one of stainless steel, fibre glass, poly para-phenyleneterephthalamide fibres or blends thereof, polybenzoxazole (PBO) fibres containing graphite, and various weaves of these fibres. Usually when the second mould member has a mould member cover, the mould member cover of the second mould member is between the second mould member and the glass sheet during steps (v), (vi) and (vii).

Preferably the first and second mould members each have a respective mould member cover, further wherein the mould member cover of the first mould member and the mould member cover of the second mould member are part of a single mould cover. During step (v) the single mould cover faces the glass sheet. Preferably the single mould cover comprises a cloth, more preferably an air permeable cloth. Preferably the cloth comprises at least one of stainless steel, fibre glass, poly para-phenyleneterephthalamide fibres or blends thereof, polybenzoxazole (PBO) fibres containing graphite, and various weaves of these fibres. Usually when the first and second mould members each have a respective mould member cover, the respective mould member cover of the first and second mould members is between the first mould member and the glass sheet and the second mould member the glass sheet respectively during steps (v), (vi) and (vii).

Preferably during step (vi) the second mould member is moved from a first position to a second position, the first position of the second mould member being displaced relative to the second position of the second mould member by more than 2 mm, preferably between 4 mm and 20 mm, more preferably between 5 mm and 10 mm.

Preferably during step (vi) the second mould member is moved by more than 2 mm relative to the first mould member, preferably between 4 mm and 20 mm relative to the first mould member, more preferably between 5 mm and 10 mm relative to the first mould member.

Preferably the first mould member has a shaping surface facing the shaping support and the second mould member has a shaping surface facing the shaping support, and before step (v) the press bending apparatus is configured such that the shaping surfaces of the first and second mould members are displaced from one another by more than 2 mm, preferably between 4 mm and 20 mm, more preferably between 5 mm and 10 mm.

During step (iii) the glass sheet is heated to temperature where the glass sheet is suitably soft (i.e. having a suitably low viscosity) to be able to be shaped by press bending, in particular by press bending between a pair of complimentary shaping members. Preferably during step (iii) the glass sheet is heated uniformly, although selected regions of glass sheet may be heated to different temperatures.

Preferably during step (iii) the glass sheet is heated to a temperature between 580° C. and 700° C.

Preferably the glass sheet is heated before positioning the glass sheet on the shaping support. However the glass sheet may be positioned on the shaping support and then heated. The glass sheet may be heated to a first temperature before being positioned on the shaping support, and subsequently heated whilst on the shaping support to a second temperature.

Preferably the glass sheet is one sheet in a stack of glass sheets, in particular a nested pair.

Preferably following step (vii), the bent glass sheet is thermally toughened by quenching the glass sheet with jets of cooling fluid directed towards at least one of the major surfaces of the glass sheet.

Preferably following step (vii) the bent glass sheet is laminated to another glass sheet using an interlayer structure comprising at least one sheet of interlayer material. Suitable interlayer material includes polyvinyl butyral, ethylene vinyl acetate copolymer, polyurethane, polycarbonate, poly vinyl chloride or a copolymer of ethylene and methacrylic acid.

Preferably the glass sheet is supported on a ring mould having an upper shaping surface for supporting the glass sheet about at least a portion of the periphery thereof.

Preferably the first mould member is an annular ring.

Preferably the second mould member is a unitary mould that is disposed at least partially within the first mould member.

Preferably the second mould member is a radially disposed within the first mould member.

Preferably the press bending apparatus comprises more than two mould members.

Preferably at least one of the first mould member, the second mould member and the shaping support is provided with heating means.

Preferably at least one of the first mould member and the second mould member comprises at least one of ceramic, aluminium, stainless steel or iron, in particular cast iron.

Preferably the shaping support is in vertical alignment with the press bending apparatus.

Methods according to the first aspect of the present invention may be used to bend a flat glass sheet such that the bent glass sheet is curved in one or more directions. Preferably the radius of curvature in at least one of the one or more directions is between 300 mm and 20000 mm, more preferably between 1000 mm and 8000 mm. When the bent glass sheet is curved in two or more directions, preferably two of the two or more direction of curvature are mutually orthogonal.

A suitable glass composition for the glass sheet is a soda-lime-silica glass composition.

A typical soda-lime-silica glass composition is (by weight), $SiO_2$ 69-74%; $Al_2O_3$ 0-3%; $Na_2O$ 10-16%; $K_2O$ 0-5%; MgO 0-6%; CaO 5-14%; $SO_3$ 0-2%; $Fe_2O_3$ 0.005-2%. The glass may also contain other additives, for example, refining aids, which would normally be present in an amount of up to 2%. The soda-lime-silica glass composition may contain other colouring agents such as $Co_3O_4$, NiO and Se to impart to the glass a desired colour when viewed in transmitted light. The transmitted glass colour may be measured in terms of a recognised standard such as BS EN410.

The present invention also provides from a second aspect an apparatus for shaping a sheet of glass comprising: a press bending apparatus comprising at least two (a first and a second) mould members each having a shaping surface, the press bending apparatus having a first configuration wherein the first and second mould members are arranged such that the shaping surface of the first mould member and the shaping surface of the second mould member are aligned to provide the press bending apparatus with a shaping surface for pressing the glass sheet when supported on a shaping support to a final shape, and a second configuration wherein the shaping surface of the first mould member is displaced relative to the shaping surface of the second mould member the first and second mould members being moveable relative to each other; the press bending apparatus further comprising control means to control the position of the first and second mould members during a press bending operation, the control means being configured to control the position of the first and second mould members relative to each other to execute at least one of the steps (v), (vi) and (vii) of the method of the first aspect of the present invention.

Preferably the shaping surface of the first mould member has at least one opening therein, and the at least one opening in the shaping surface of the first mould member is in fluid communication with at least one negative pressure source, in particular at least one vacuum source. Preferably the control means also controls the at least one negative pressure source to produce at least one region of negative pressure at the at least one opening in the shaping surface of the first mould member after step (vii) in the method according to the first aspect of the present invention. Preferably the control means also controls the at least one negative pressure source to produce at least one region of negative pressure at the at least one opening in the shaping surface of the first mould member during at least one of the steps (v), (vi) and (vii) in the method according to the first aspect of the present invention.

Preferably the shaping surface of the second mould member has at least one opening therein, and the at least one opening in the shaping surface of the second mould member is in fluid communication with at least one negative pressure source, in particular at least one vacuum source. Preferably the control means also controls the at least one negative pressure source to produce at least one region of negative pressure at the at least one opening in the shaping surface of the second mould member after step (vii) in the method according to the first aspect of the present invention. Preferably the control means also controls the at least one negative pressure source to produce at least one region of negative pressure at the at least one opening in the shaping surface of the second mould member during at least one of the steps (v), (vi) and (vii) in the method according to the first aspect of the present invention.

Preferably the press bending apparatus is arranged such that there is at least one (a first) gap between the shaping surface of the first mould member and the shaping surface of the second mould member when the press bending apparatus is in the first configuration, more preferably wherein the first gap is in fluid communication with at least one negative pressure source, in particular vacuum source. Preferably the control means also controls the at least one negative pressure source to produce at least one region of negative pressure at the first gap after step (vii) in the method according to the first aspect of the present invention. Preferably the control means also controls the at least one negative pressure source to produce at least one region of negative pressure at the first gap during at least one of the steps (v), (vi) and (vii) in the method according to the first aspect of the present invention.

Preferably at least one of the first mould member and the second mould member comprises at least one of ceramic, aluminium, stainless steel or iron, in particular cast iron.

Preferably the first mould member is an annular ring.

Preferably the second mould member is a unitary mould that is disposed at least partially within the first mould member.

Preferably the second mould member is radially disposed within the first mould member.

Preferably the first mould member is an annular ring and the second mould member is radially disposed within the first mould member.

Preferably the shaping surface of the first and/or second mould member comprises a cloth, preferably an air-permeable cloth. Preferably the cloth comprises at least one of stainless steel, fibre glass, poly para-phenyleneterephthalamide fibres or blends thereof, polybenzoxazole (PBO) fibres containing graphite, and various weaves of these fibres.

Preferably at least one of the first mould member and the second mould member is provided with heating means.

From a third aspect the present invention provides an assembly comprising a press bending apparatus according to the second aspect of the present invention and a shaping support for supporting a glass sheet thereon.

Preferably the press bending apparatus is vertically disposed relative to the shaping support.

Preferably the press bending apparatus is aligned with the shaping support.

Preferably the shaping support has an upper shaping surface and the upper shaping surface of the shaping support is complementary with the shaping surface of the press bending apparatus in the first configuration.

Preferably the shaping support has a concave upper shaping surface.

Preferably the shaping support is a ring mould having an upper shaping surface for supporting a glass sheet about at least a portion of the periphery thereof.

Preferably the assembly has at least three configurations, a first configuration for the assembly where the press bending apparatus is in a first arrangement and spaced relative to the shaping support by a first distance, a second configuration for the assembly where the press bending apparatus is in a second arrangement and a third configuration for the assembly where the press bending apparatus is in a third arrangement where the shaping surfaces of the first and second mould members are aligned but the press bending member is spaced relative to the shaping support by a second distance different to the first distance. Preferably the first arrangement is the same as the second arrangement.

In use it is preferred to configure the assembly such that the press bending apparatus is vertically disposed relative to the support.

Embodiments of the present invention will now be described by way of example only with reference to the accompanying drawings (not to scale), in which:

FIG. 2 shows a schematic isometric representation of a two part press bending member in a first arrangement;

FIG. 3 shows a schematic isometric representation of the two part press bending member of FIG. 2 but in a second arrangement;

FIG. 4 shows a schematic isometric representation of the underside view of the two part press bending member shown in FIG. 3 in a spaced apart relationship to a lower support frame;

Figure 8:
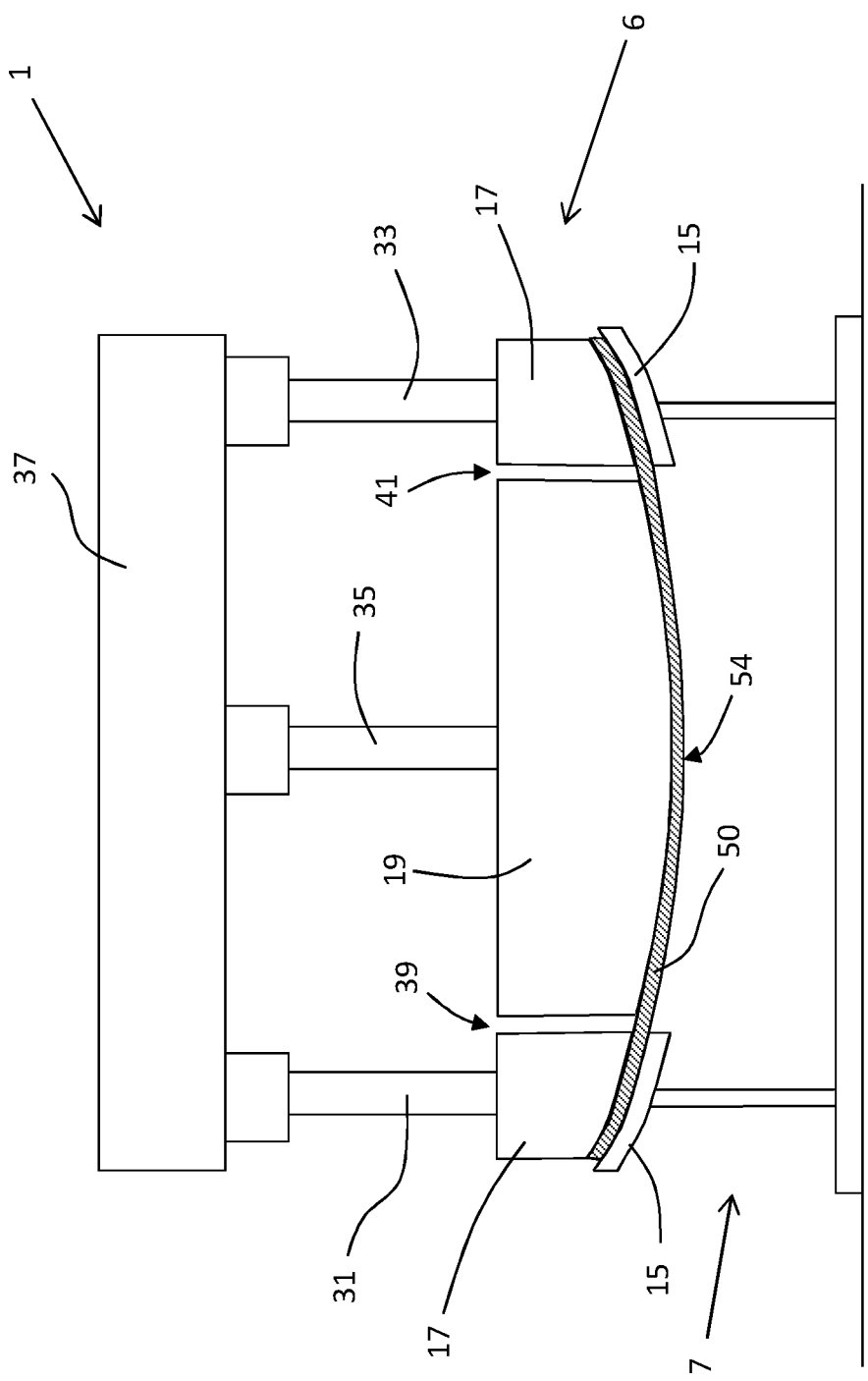
FIG. 8 shows a schematic side view of the press bending station of FIG. 1 in a fourth configuration, where the first and second parts of the two part press bending member have moved to the final bending position.
Figure 20:
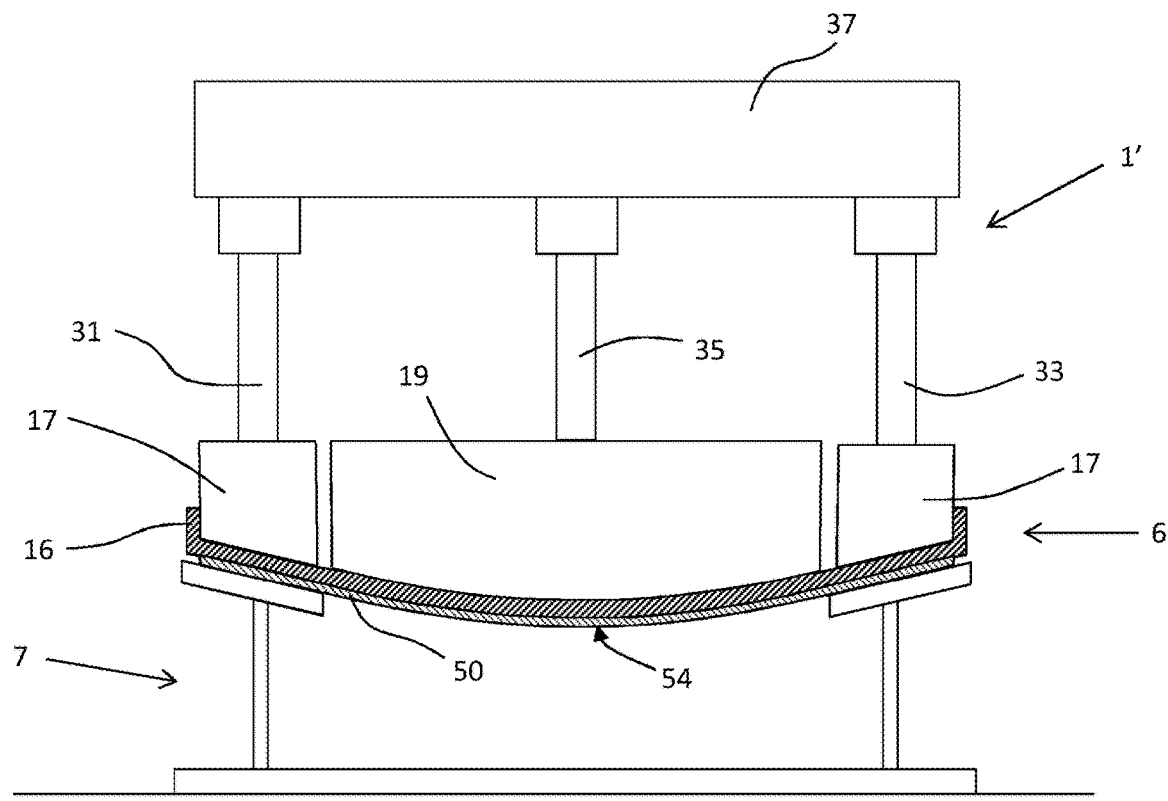
Figure 21:
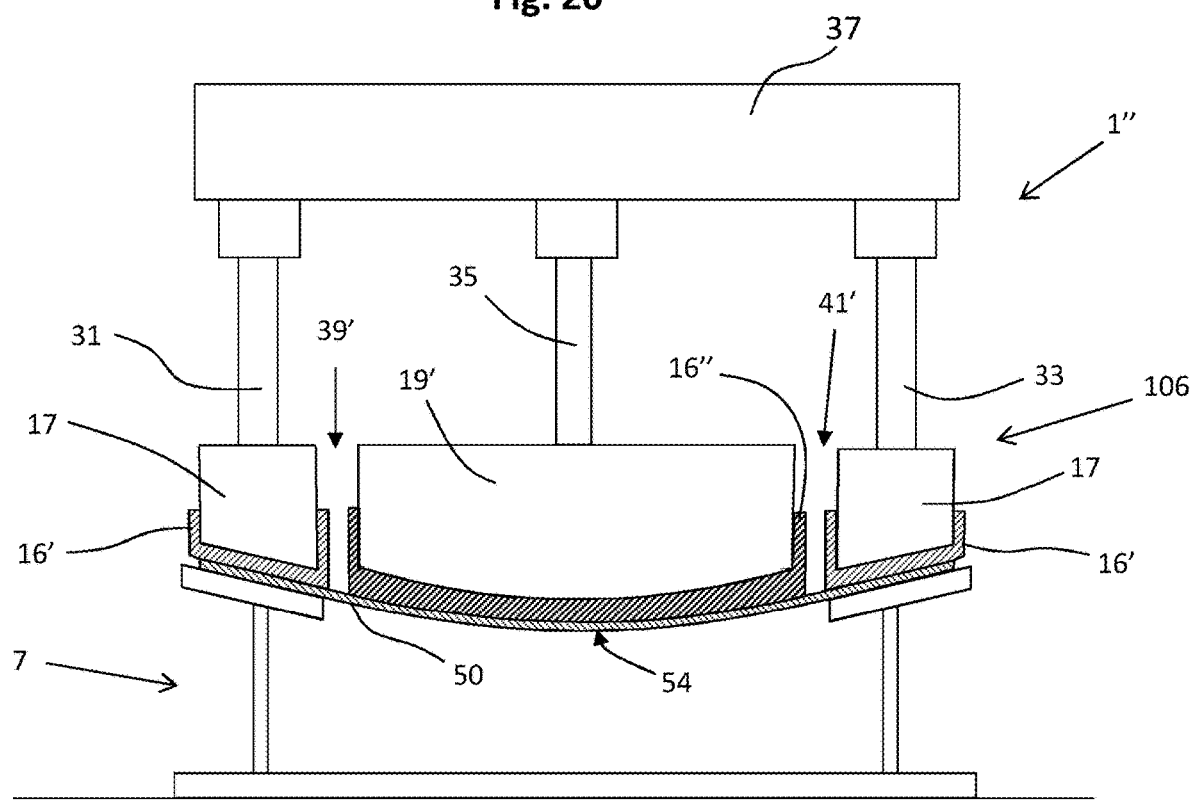

FIG. 20 shows a schematic side view of a press bending station similar to that as shown in FIG. 8 but with a single cloth covering the first and second mould members of the two part press bending member; and FIG. 21 shows a schematic side view of a press bending station similar to that as shown in FIG. 8 but with a first cloth covering the first mould member and a different second cloth covering the second mould member of the two part press bending member.

Figure 1:
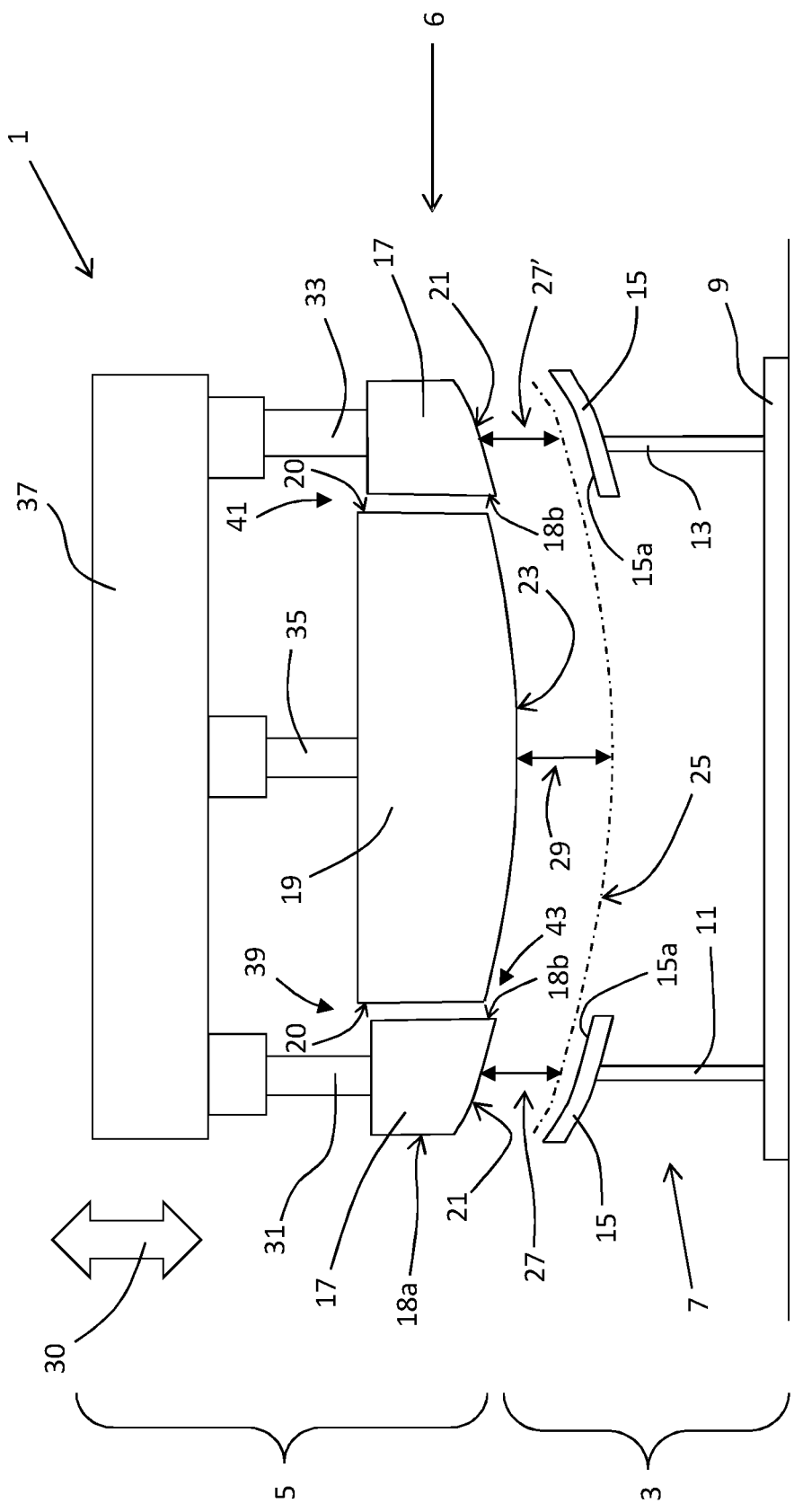
FIG. 1 shows a schematic side view of a press bending station in a first configuration for bending a sheet of glass.

FIG. 1 shows a side view schematic representation of a press bending station 1 for bending a sheet of glass. The press bending press station 1 includes a lower portion 3 and an upper portion 5.

The lower portion 3 of the press bending station 1 includes a shaping support for supporting a glass sheet thereon. In this example the shaping support is a frame 7 having a base 9 with first and second uprights 11, 13 extending upwards therefrom. A lower support 15 in the form of an annular ring is mounted on the first and second uprights 11, 13. The lower support 15 has an upper shaping surface 15a for supporting a sheet of glass thereon, as is conventional in the art i.e. the sheet of glass (not shown) is supported about a peripheral region on the upper shaping surface 15a of the lower support 15.

Typically in the art the lower portion 3 is referred to as bending frame, or a female bending frame. Instead of a substantially annular supporting ring 15, a full contact support may be mounted on the ends of the uprights 11, 13.

In the example of FIG. 1 the upper shaping surface of the lower support 15 is concave. The lower support 15 may also be referred to as a "shaping rail", or simply a "rail".

Although only two uprights 11, 13 are shown in FIG. 1, in practice there may be a plurality of uprights on which the lower support 15 is mounted.

The upper portion 5 of the press bending station 1 includes a press bending apparatus comprising a two part press bending member 6 comprising a first mould member 17 and a second mould member 19. Examples of this type of two part mould are described in U.S. Pat. No. 5,122,177, WO2012166365A1 and US2015/0007612A1.

With further reference to FIGS. 2, 3, 4 and 5, the first mould member 17 is an annular ring having a lower shaping surface 21. The second mould member 19 is a unitary mould member that fits inside the central opening of the first mould member 17 such that the second mould member 19 can move vertically relative to the first mould member 17. The second mould member 19 is radially disposed within the first mould member 17.

The first mould member 17 has an outer peripheral wall 18a and an opposing inner peripheral wall 18b. The second mould member 19 has an outer peripheral wall 20. The outer peripheral wall 20 of the second mould member 19 faces the inner peripheral wall 18b of the first mould member 17 and is spaced therefrom by a gap 40. In the cross sectional view of FIG. 1, the gap 40 is represented by two gaps 39 and 41.

The second mould member 19 has a lower shaping surface 23. The shaping surfaces 21, 23 are configured to provide the desired curvature of a glass sheet in those regions of the glass sheet to be contacted by the shaping surfaces 21, 23, when the glass sheet is supported on the frame 7 i.e. on upper shaping surface 15a of support 15 and when the first and second mould members are in a certain pre-determined arrangement.

As shown more clearly in FIG. 4, the lower support 15 is mounted on one side on uprights 11, 11' and 11''' and on the opposite side on uprights 13, 13' and 13''. The uprights 11, 11', 11'', 13, 13', 13'' extend upwards from the base 9, being connected at one end to the base 9 and at the opposite end to the lower support 15. Additional uprights may be used. Reinforcing cross members between uprights may also be used.

Figure 5:
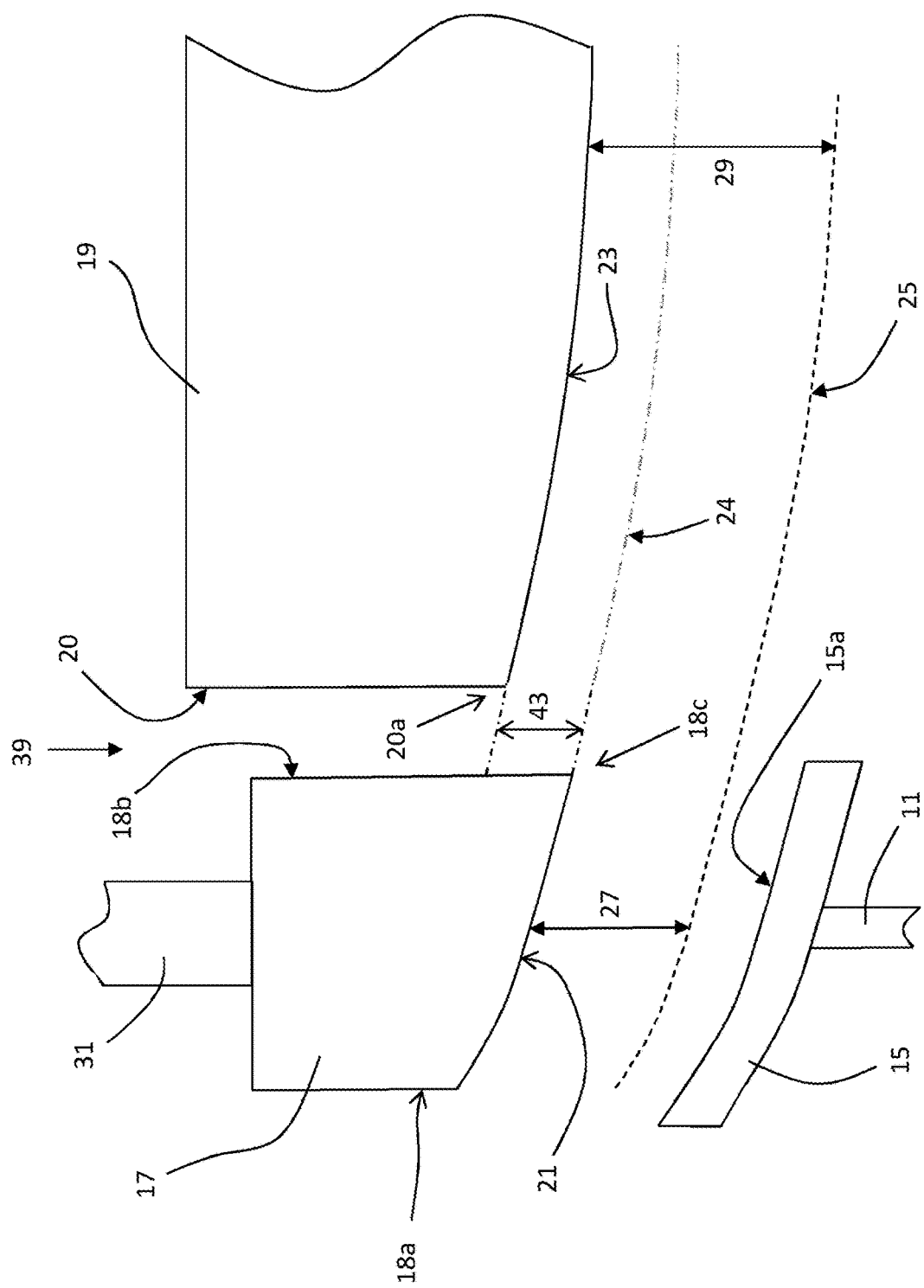
FIG. 5 shows schematic representation of an expanded portion of the press bending station shown in FIG. 1.

With further reference to FIG. 5, when the outer peripheral edge 20a of the second mould member 19 is aligned with the inner peripheral edge 18c of the first mould member 17, the two part press bending member 6 has a shaping surface corresponding to the desired final shaping surface, as indicated by dotted line 24. In this example the shaping surface of the two part press bending member 6 is a convex shaping surface configured to be complementary with the upper shaping surface 15a of the lower support 15. The desired final shaping surface 24 is shown as dotted line 25 in the final desired position for shaping a glass sheet supported on upper shaping surface 15a of lower support 15 to a final desired shape.

With reference to FIGS. 1 and 5, the first mould member 17 is displaced relative to the second mould member 19 such that the shaping surface of the two part press bending member is not the desired final shaping surface for the two part press bending member. The outer peripheral edge 20a of the second mould member 19 is displaced from the inner peripheral edge 18c of the first mould member 17 by an amount 43.

The first mould member 17 is movable in a vertical direction (shown by arrow 30) by means of the linear actuators 31 and 33. The movement of the linear actuators 31, 33 is synchronised such that both sides of the first mould member 17 move upwards and downwards at the same time.

The second mould member 19 is movable in a vertical direction 30 by means of the linear actuator 35.

The first mould member 17 and the second mould member 19 are both independently moveable in a vertical direction relative to one another.

The linear actuators 31, 33 and 35 are mounted to a suitable gantry 37, the gantry being fixed spatially in relation to the frame 7.

The movement of the linear actuators 31, 33 and 35 may be controlled by suitable control means (not shown), such as a computer based system.

In the configuration shown in FIG. 1 (and FIG. 5 which is an enlarged view of a portion of the left hand side of FIG. 1), the shaping surface 21 of the first mould member is displaced from the final desired position represented by dotted line 25 by a vertical distance 27 on one side and a vertical distance 27' on the other side. It is preferred for the distances 27 and 27' to be the same.

The shaping surface 23 of the second mould member 19 is displaced from the final desired position represented by dotted line 25 by a vertical distance 29.

The press bending station 1 is shown in FIG. 1 in a first configuration with the shaping surface 23 displaced by an amount 43 relative to the shaping surface 21, as discussed above. Due to the displacement 43, the two part mould 6 is not arranged to bend a glass sheet supported on the frame 7 to a final desired shape.

In FIG. 1 two gaps 39, 41 between the inner peripheral wall 18b of the first mould member 17 and the outer peripheral wall 20 of second mould member 19 are shown. These two gaps 39, 41 are part of a continuous gap 40 that extends between the first and second mould members 17, 19, as illustrated in FIGS. 2-4. The gap 40 may be in fluid communication with a suitable vacuum source to assist with shaping a glass sheet by providing negative pressure regions at the gap. As can be seen, the gap 40 extends to the shaping surface of the two part press bending member 6.

Figure 6:
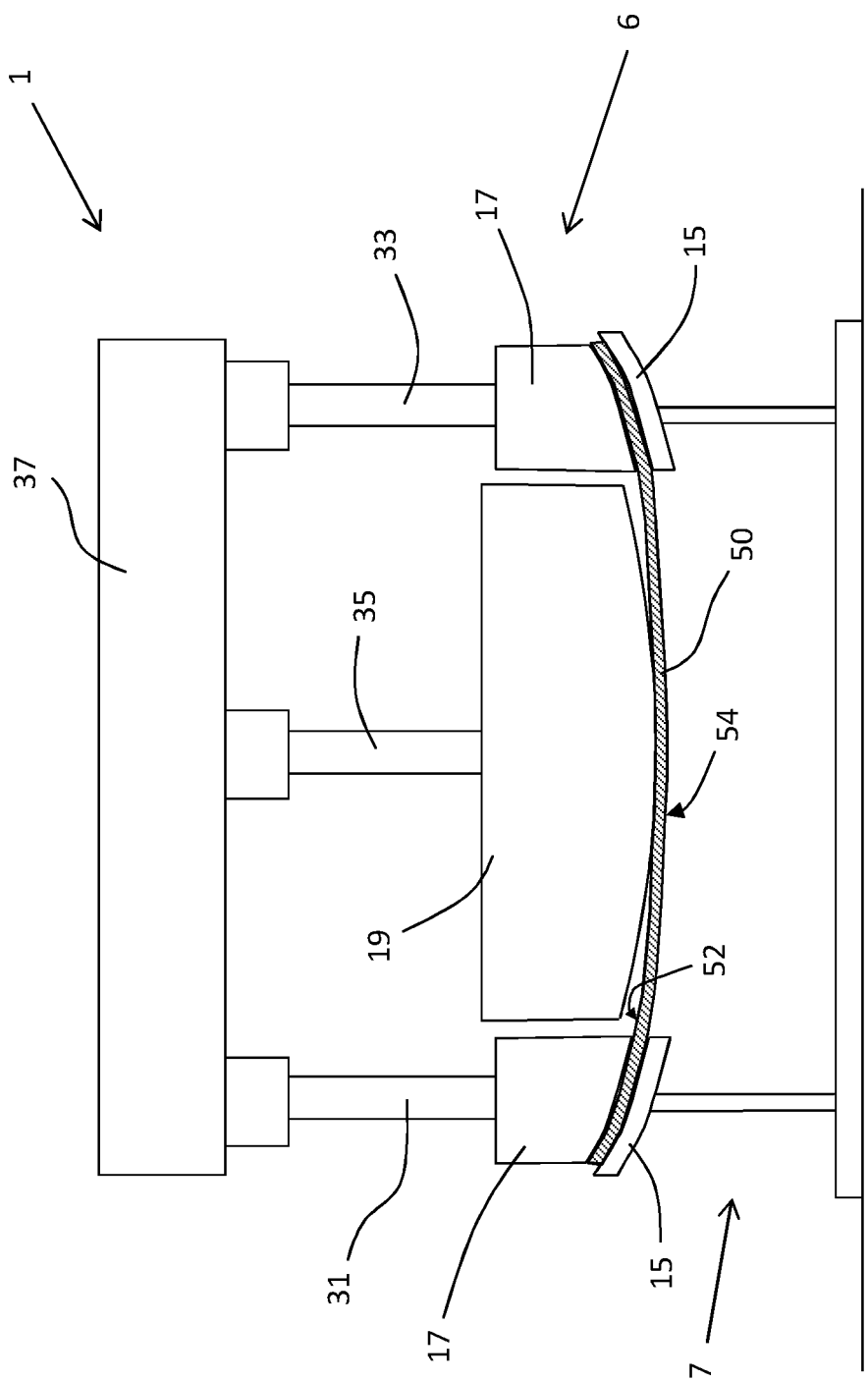
FIG. 6 shows a schematic side view of the press bending station of FIG. 1 in a second configuration.

FIG. 6 shows the press bending station 1 in a different configuration to that shown in FIG. 1. In this second configuration a glass sheet 50 has been positioned on the frame 7 and is part way through a press bending process according to the present invention. The glass sheet 50 has a major surface 52 facing the two part press bending member 6 and an opposing major surface 54 facing the base 9 (and consequently facing the frame 7 and the lower support 15). The major surface 54 of the glass sheet 50 is in contact with the upper shaping surface 15a (not labelled on this figure, but see FIG. 1) of the lower support 15.

Starting from the configuration shown in FIG. 1, the first mould member 17 and the second mould member 19 have both moved downwards towards the frame 7 by energising respective linear actuators 31, 33 and 35. The downward movement of both the first and second mould members 17, 19 is synchronised so that the first and second mould members 17, 19 move downwards with no relative movement therebetween.

The downwards movement of the first and second mould members 17, 19 towards the frame 7 may be in one or more stages with or without relative movement between the first and second mould members in each stage. In one example in a first stage of downward movement the downward velocity of the first and second mould members is at a first velocity u1, and in a second stage of downward movement following the first stage of downward movement, the downward velocity of the first and second mould members is at a second velocity u2. It is preferred to have u1>u2 such that the first and second mould member 17, 19 move faster in the first stage of downward movement than in the second stage of downward movement.

With reference to FIGS. 1 and 6, in the second configuration as shown in FIG. 6 the shaping surface 21 of the first mould member 17 has made contact with the major surface 52 of the glass sheet 50 in a peripheral region thereof. Due to the particular arrangement of the first mould member 17 and second mould member 19, the shaping surface 23 of the second mould member 19 has also made contact with the second major 52 surface of the glass sheet 50 in a central region thereof, the central region being inboard of the peripheral region of the glass sheet. The final desired position of the first and second mould members 17, 19 have not yet been reached.

Figure 7:
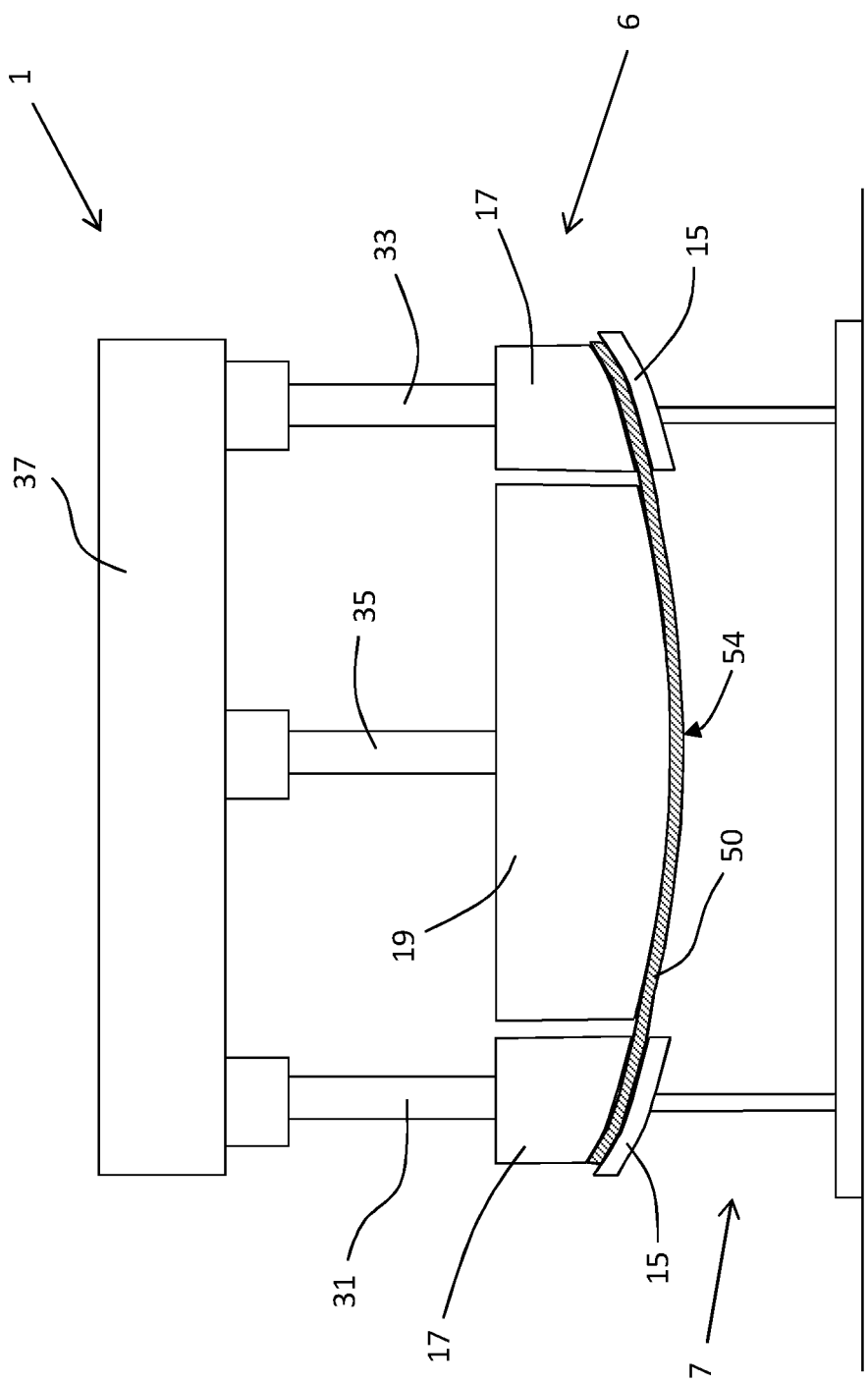
FIG. 7 shows a schematic side view of the press bending station of FIG. 1 in a third configuration where the first and second parts of the two part press bending member have not moved to the final bending position.

In FIG. 7 the press bending station 1 is shown in another configuration, different to the configuration shown in FIGS. 1 and 6. Prior to this configuration the press bending station 1 was in the configuration shown in FIG. 6.

In this third configuration shown in FIG. 7, the second mould member 19 has moved downwards by energising the linear actuator 35 such that the shaping surface 23 of the second mould member 19 further contacts the major surface 52 of the glass sheet 50 in the central region thereof to press bend the central region of the glass sheet 50. In this example, the shaping surface 23 is shown aligned with the shaping surface 21 (such that, with reference to FIG. 5, the displacement 43 is zero).

In this third configuration, although the first and second mould members 17, 19 are arranged to provide the two part press bending member 6 with a final desired shaping surface, the final desired position of the first and second mould members 17, 19 has still not been reached. With reference to FIG. 5, the displacement 43 is zero, but the vertical distance 27 and the vertical distance 29 are both greater than zero because the shaping surface 21 and the shaping surface 23 have not reached the final position indicated by dotted line 25.

The final desired position for the first and second mould members 17, 19 may be reached by further moving the first and second mould members 17, 19 downwards towards the frame 7 to further press bend the glass sheet 50 in the peripheral and central regions thereof. In this example, in moving to the final desired position for the first and second mould members there is no relative movement between the first and second mould members such that the shaping surface 23 remains aligned with the shaping surface 21 during this further movement step. This is further described with reference to FIG. 8, although due to the scale of the figures it is difficult to represent the different configurations.

In a fourth configuration shown in FIG. 8, the shaping surface 21 of the first mould member 17 is aligned with the shaping surface 23 of the second mould member 19. With reference to FIG. 5, the displacement 43 is zero. The two part press bending member 6 in this arrangement has a pressing surface for pressing the glass sheet 50 supported on the frame 7 to a final desired shape and the press bending is configured such that the desired shaping surface of the two part press bending member 6 is also in the desired position. With reference to FIG. 5, the shaping surface 21 and the shaping surface 23 both lie on the dotted line 25 in this fourth configuration. Starting from the configuration shown in FIG. 7, the first and second mould members were both move to the desired final position at the same time such that the shaping surfaces 21, 23 remained aligned in moving from the configuration shown in FIG. 7 to the configuration shown in FIG. 8.

In the configuration shown in FIG. 8, the gaps 39, 41 are in fluid communication with a vacuum source (not shown) for providing a negative pressure region at the major surface 52 of the glass sheet 50 in at least the vicinity of the glass sheet facing the gaps 39, 41.

The vacuum source may apply a vacuum to the gaps 39, 41 for any desired amount of time in order to improve the bending of the glass sheet 50. It is preferred to apply the vacuum source to the gaps 39, 41 after the press bending station has reached the fourth configuration described above. The vacuum may be applied in stages, with a different level of vacuum applied in one stage compared to another. The duration of the vacuum stages may be the same or different. The duration of the vacuum in one or more vacuum stage may be between 0.05 and 5 seconds.

Figure 9:
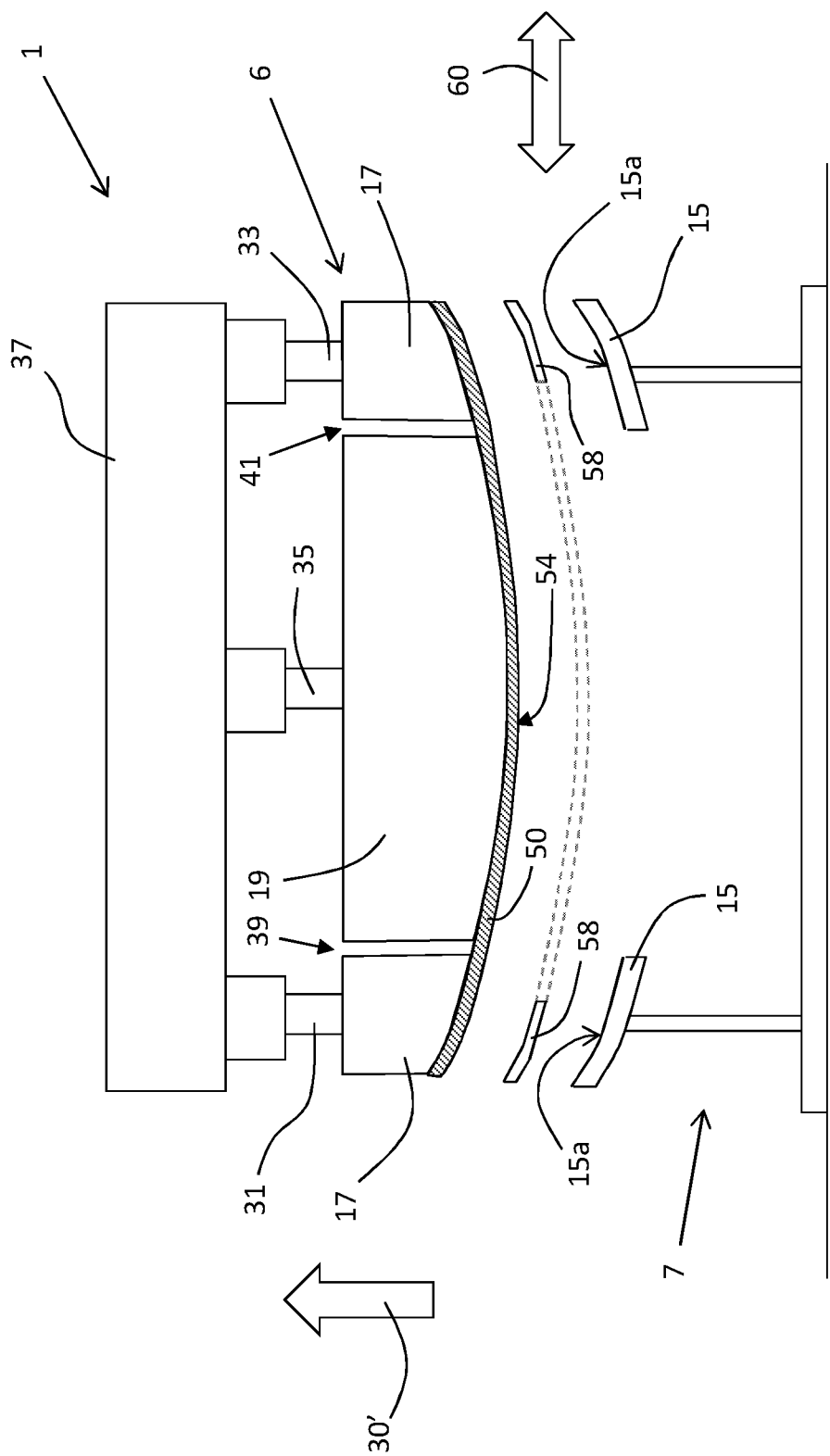
FIG. 9 shows a schematic side view of the press bending station of FIG. 1 in a fifth configuration, where the first and second parts of the two part press bending member are in the same arrangement as in FIG. 7 and FIG. 8 but both have been moved vertically and are shown with the bent glass sheet supported on the shaping surface of the two part press bending member.

In FIG. 9 the press bending station 1 is shown in another (a fifth) configuration. In this fifth configuration the two part press bending member 6 is essentially arranged in the same way as shown in FIG. 8 because the shaping surfaces of the first and second mould members 17, 19 are aligned (with reference to FIG. 5 the displacement 43 is zero). However in contrast to the configuration of the press bending station 1 shown in FIG. 8, the configuration of the press bending station 1 shown in FIG. 9 differs because the two part mould 6 had been raised relative to the frame 7 by suitable actuation/energisation of the linear actuators 31, 33, 35. The first and second mould members 17, 19 have been moved upwards in the direction of arrow 30' at the same rate towards the gantry 37 i.e. the movement of the first and second mould members 17, 19 upwards towards the gantry 37 is synchronised with no relative movement between the first and second mould members.

The bent glass sheet 50 is shown supported on the underside of the two part press bending member 6 by means of a vacuum being applied at the gaps 39, 41 (and hence gap 40, see FIGS. 2-4) to create a region of negative pressure at the major surface 52 of the glass sheet opposite the gap(s).

In addition to a vacuum being applied at the gaps 39, 41, the shaping surface 21 of the first mould member 17 may have openings therein that are in fluid communication with a vacuum source (which may be the same vacuum source as used to provide a vacuum at the gaps 39, 41). The vacuum source in fluid communication with the openings in the shaping surface 21 may also be used to support the glass sheet 50 on the underside of the two part press bending member 6.

Furthermore, in addition to a vacuum being applied at the gaps 39, 41 and/or at openings in the shaping surface 21 of the first mould member 17, the shaping surface 23 of the second mould member 19 may have openings therein that are in fluid communication with a vacuum source (which may be the same vacuum source as used to provide a vacuum at the gaps 39, 41). The vacuum source in fluid communication with the openings in the shaping surface 23 may also be used to support the glass sheet 50 on the underside of the two part press bending member 6.

A carrier ring 58 is shown disposed between the frame 7 (i.e. above the upper shaping surface 15*a* of lower support 15) and the two part press bending member 6. At a suitable time in the bending operation, the vacuum applied at the gaps 39, 41 (or gap 40) is terminated such that the bent glass sheet 50 is no longer supported on the underside of the two part press bending member 6 and instead falls therefrom to be supported by the carrier ring 58. The gaps 39, 41 (or gap 40) may also be in fluid communication with a suitable fluid source such as compressed air, such that after the vacuum at the gaps 39, 41 is terminated, fluid i.e. compressed air is caused to flow through the gaps 39, 41 towards the glass sheet 50 to assist with the removal of the bent glass sheet 50 from the shaping surfaces 21, 23 of the respective first and second mould members 17, 19.

Suitable actuators (not shown) are provided for moving the carrier ring 58 in the direction of arrow 60 away from being between the frame 7 and two part press bending member 6. Thereafter the bent glass sheet may be deposited onto suitable conveyor means (not shown) for subsequent annealing or toughening.

As discussed above, although not shown in the figures, the shaping surface 21 of the first mould member 17 and/or the shaping surface 23 of the second mould member 19 may have at least one opening therein, said opening being in fluid communication with at least one source of negative pressure such as a vacuum source.

In addition to a negative pressure region produced at the gap 40, there may be additional negative pressure regions at the or each opening in the shaping surface 21 of the first mould member 17 and/or the or each opening in the shaping surface 23 of the second mould member 19 to enable improved shape control when bending the glass sheet.

If the shaping surface 21 of the first mould member 17 has one or more opening therein for the provision of a vacuum (for example as described above in relation to the gaps 39, 41), any number of said openings in the shaping surface 21 may also be in fluid communication with a suitable fluid source such as compressed air to assist with the removal of the bent glass sheet from the shaping surface 21 by causing the fluid to flow through said openings towards the glass sheet after the vacuum has been terminated.

Likewise, if the shaping surface 23 of the second mould member 19 has one or more opening therein for the provision of a vacuum (for example as described above in relation to the gaps 39, 41), any number of said openings in the shaping surface 23 may also be in fluid communication with a suitable fluid source such as compressed air to assist with the removal of the bent glass sheet from the shaping surface 23 by causing the fluid to flow through said openings towards the glass sheet after the vacuum has been terminated.

To further illustrate the sequence of movement of the first and second mould members 17, 19 during the shaping process according to the present invention, left hand portions of FIGS. 1 (except with a glass sheet 50 on the frame 7), 6, 7 and 8 have been enlarged and provided as additional figures. These enlarged portions of the aforementioned figures are shown in FIGS. 10, 12, 13 and 14 respectively. An additional FIG. 11 is included to show the moment during the shaping operation when the shaping surface 23 of the second mould member 19 contacts the glass sheet 50 in the central region thereof before shaping surface 21 of the first mould member 17 contacts the glass sheet 50 in the peripheral region thereof.

Figure 10:
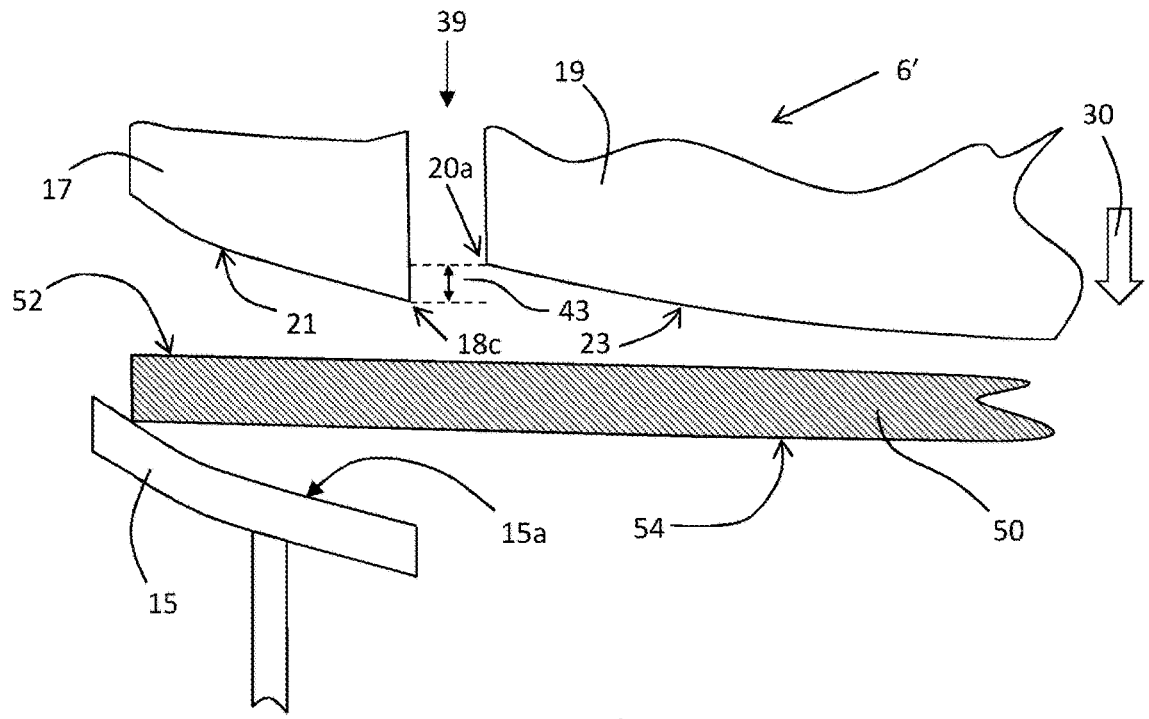
FIG. 10 shows an enlarged schematic representation of a portion of the press bending station shown in FIG. 1 with a glass sheet on the lower support.
Figure 11:
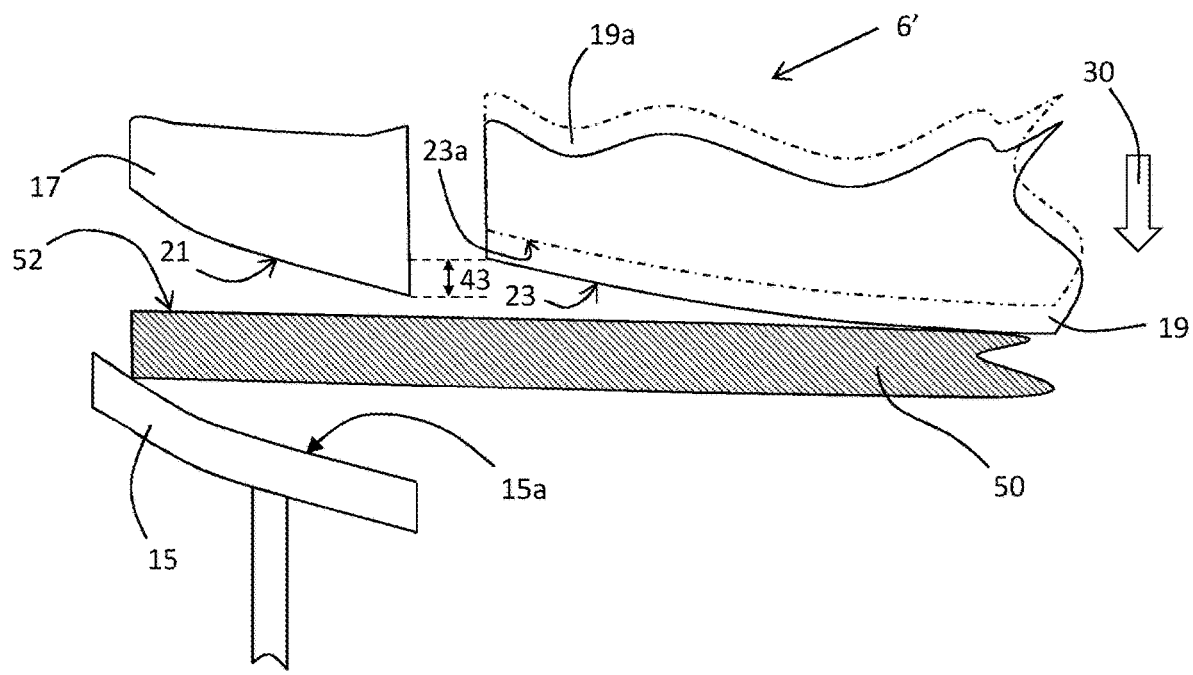
FIG. 11 shows an enlarged schematic representation of a portion of the press bending station shown in FIG. 10 after the two part press bending member has moved downwards to contact the glass sheet in the central region thereof.

With reference to FIGS. 1 and 10, a glass sheet 50 is shown supported on the shaping surface 15*a* of the lower support 15. The glass sheet has been suitably positioned onto the shaping surface 15*a* using methods known in the art. The glass sheet 50 has a first major surface 52 and a second opposing major surface 54. The second major surface 54 contacts the upper shaping surface 15*a* of the lower support 15. The glass sheet has been heat softened and may sag slightly in the central region thereof.

A portion of the two part press bending member 6 is shown (designated 6') positioned above the glass sheet 50. The first mould member 17 has shaping surface 21 facing the first major surface 52 of the glass sheet 50 and the second mould member 19 has shaping surface 23 facing the first major surface 52 of the glass sheet 50.

As described above, the shaping surfaces 21, 23 are offset from one another by displacement 43 because the edges 18*c* and 20*a* are not aligned.

As shown in this figure, neither shaping surfaces 21, 23 have contacted the glass sheet 50.

In FIG. 11 both the first and second mould members 17, 19 have moved downwards together such that there is no relative movement between them i.e. starting from the configuration shown in FIG. 10, both first and second mould members 17, 19 moved in the direction of arrow 30 at the same speed. As such the shaping surfaces 21, 23 are still not aligned and the displacement 43 referred to above is still present (in this case the displacement 43 is the same as in FIG. 10). In this configuration the shaping surface 23 has just contacted the first major surface 52 of the glass sheet 50. However because of the particular arrangement of the first and second mould members 17, 19 of the two part press bending member 6', the position of the first mould member 17 relative to the second mould member 19 is such that the shaping surface 21 has not yet contacted the first major surface 52 of the glass sheet 50 (although the shaping surface 23 has already contacted the first major surface 52 of the glass sheet 50).

A different arrangement of the first and second mould members 17, 19 of the two part press bending member 6' may be used where the second mould member 19 is arranged relative to the first mould member 17 such that the shaping surface 21 of the first mould member 17 contacts the first major surface 52 of the glass sheet before the shaping surface 23 of the second mould member 19 contacts the first major surface 52 of the glass sheet. The position of the second mould member in this alternative embodiment is shown in phantom as 19*a* having a shaping surface 23*a*. It will be readily apparent that the first and second mould members may be arranged such that the respective shaping surfaces thereof contact the first major surface 52 of the glass sheet 50 at the same time when both the first and second mould members move downwards towards the frame at the same rate.

Figure 12:
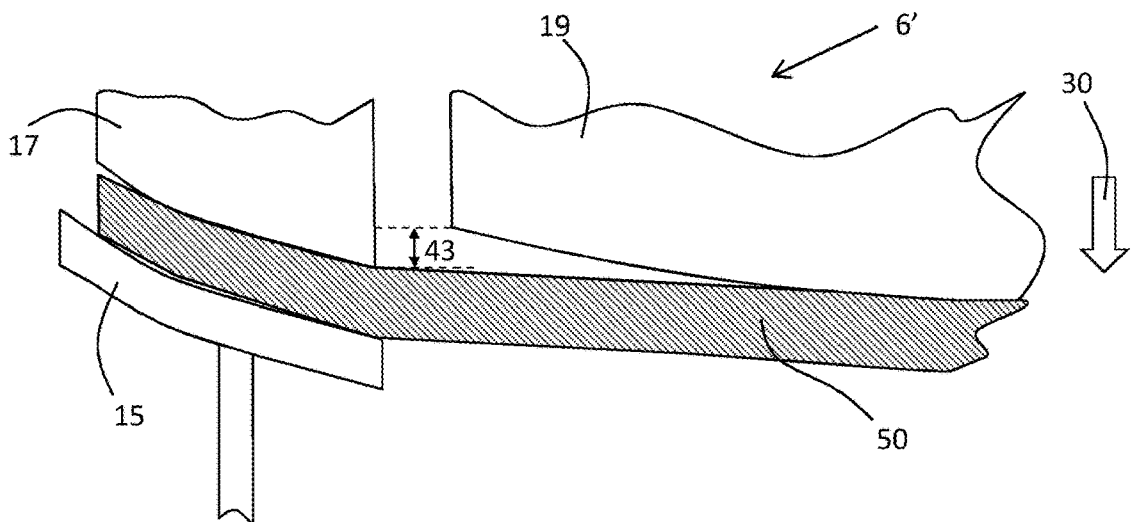
FIG. 12 shows an enlarged schematic representation of a portion of the press bending station shown in FIG. 6.

FIG. 12, which is an enlarged view of a portion of the left hand side of FIG. 6, shows the glass sheet 50 being partially pressed in the peripheral region thereof between the first shaping member 17 and the lower support 15. Since the first and second mould members have both continued to move downwards (in the direction of arrow 30) at the same rate (when starting in the arrangement shown in FIG. 10 or 11), the glass sheet 50 is also slightly pressed in the central region thereof by the second mould member 19. However the shaping surfaces of the first and second mould members still have a non-zero displacement 43 as described above.

Figure 13:
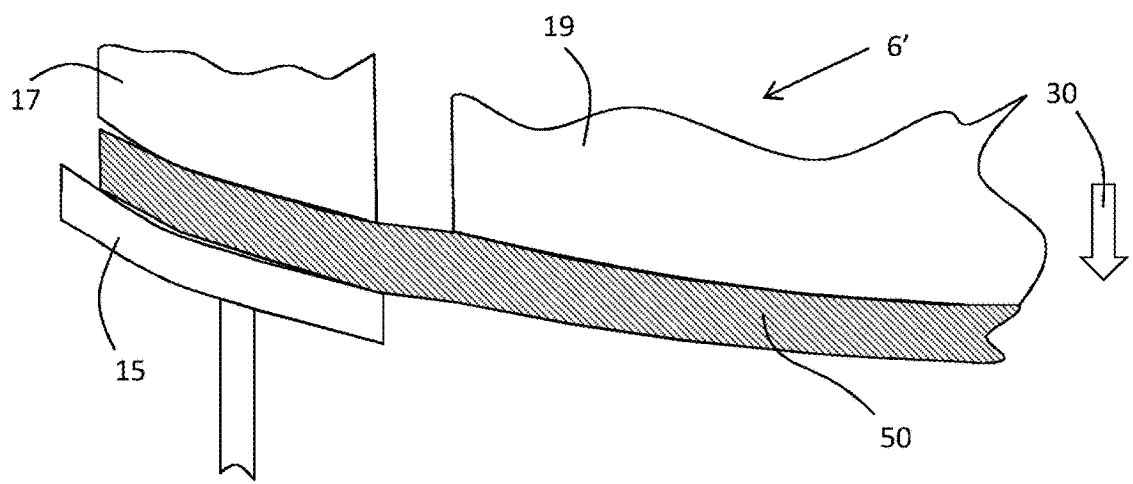
FIG. 13 shows an enlarged schematic representation of a portion of the press bending station shown in FIG. 7.

FIG. 13, which is an enlarged view of a portion of the left hand side of FIG. 7, shows the two part press bending member 6' after the arrangement shown in FIG. 12, where the first mould member 17 has remained static relative to the lower support 15 and the second mould member 19 has moved further downwards (in the direction of arrow 30) to press bend the glass sheet 50 in a central region thereof. The glass sheet 50 is sufficiently held at the peripheral region thereof by being partially pressed between the first mould member 17 and the lower support 15. In this configuration there is no displacement between the shaping surfaces 21, 23 of the first and second mould members 17, 19 (displacement 43 is zero). The two part press bending member 6' therefore has the desired final shaping surface but the two part press bending member is not in the final position to fully press bend the glass sheet 50 to the desired shape. This is shown in the following FIG. 14.

Figure 14:
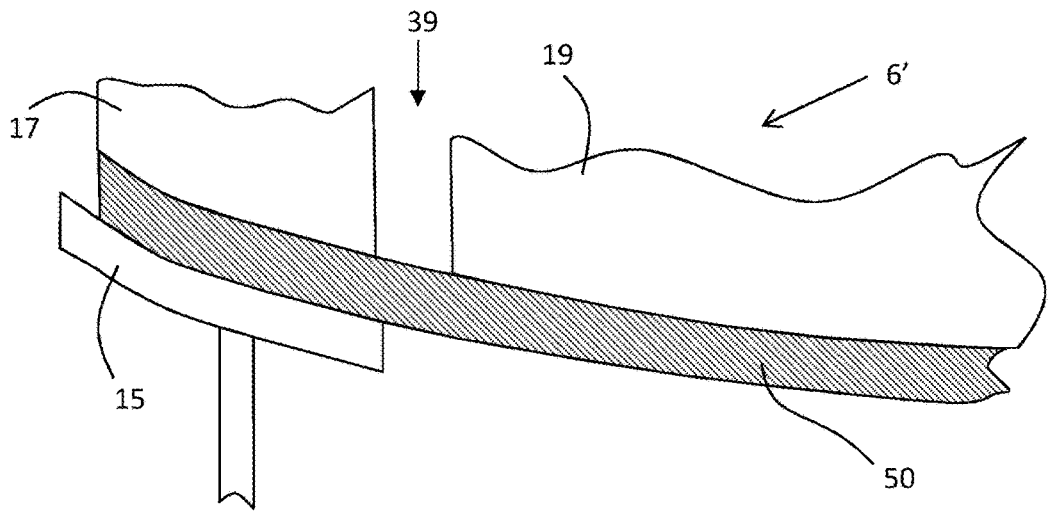
FIG. 14 shows an enlarged schematic representation of a portion of the press bending station shown in FIG. 8.

FIG. 14, which is an enlarged view of a portion of the left hand side of FIG. 8, shows the two part press bending member 6' after the configuration shown in FIG. 13 where the first mould member 17 and the second mould member have both moved downwards (in the direction of arrow 30) at the same time i.e. there is no relative movement between the first mould member 17 and the second mould member 19. Again there is no displacement between the shaping surfaces of the first and second mould members (displacement 43 is zero). The two part press bending member 6' has the desired final shaping surface (because the displace 43 is zero) and has moved to the final position (see dotted line 25 in FIG. 5) to fully press bend the glass sheet 50 to the desired shape. After this final press bending step, a vacuum may be produced at gap 39 (and gap 41, see FIG. 8) to hold the glass sheet 50 to the underside of the two part mould 6' and to improve shape control of the bent glass sheet as discussed above.

Figure 15:
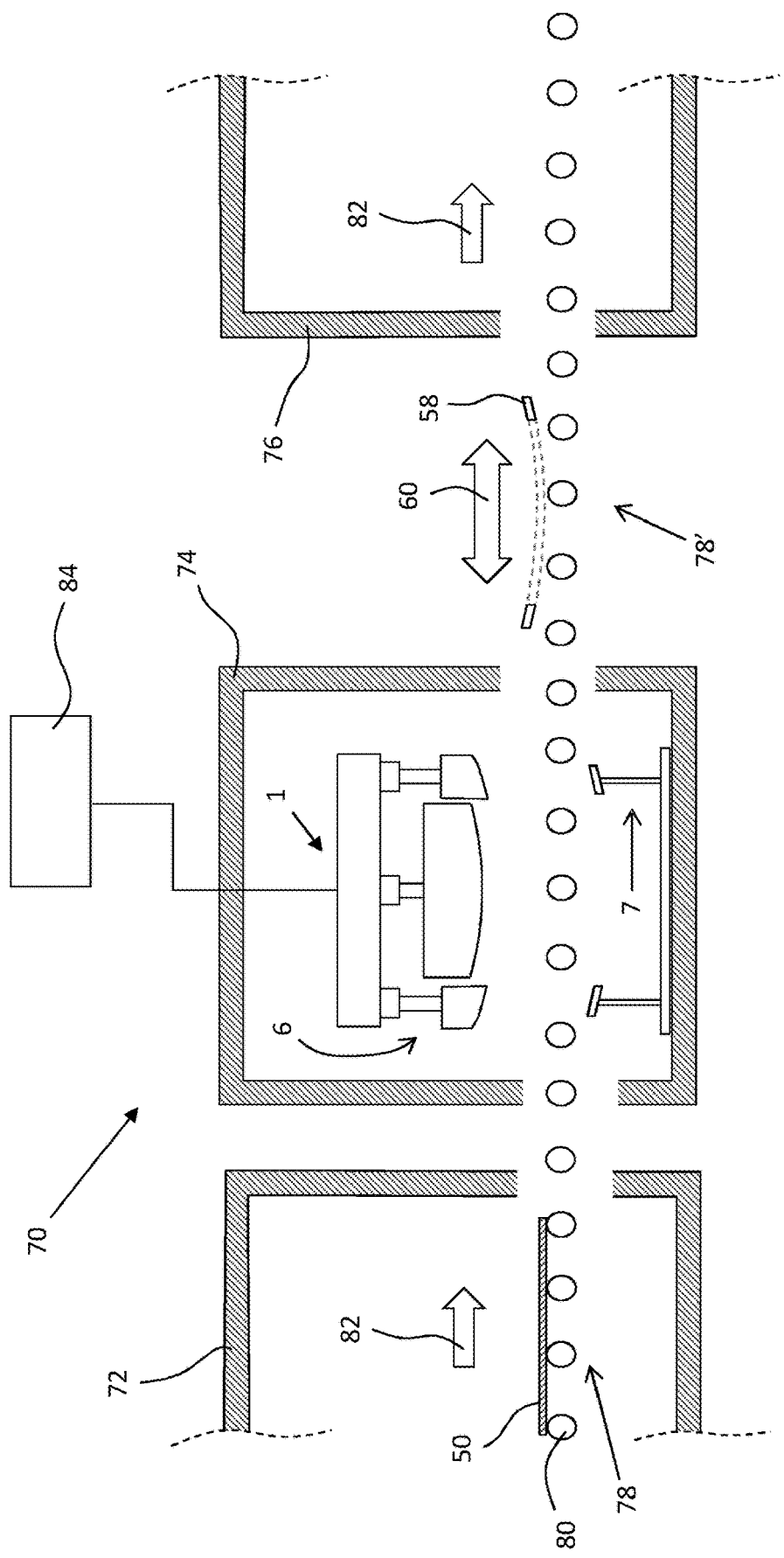
FIG. 15 shows a schematic side view representation of a glass bending line incorporating the press bending station shown in FIG. 1.

FIG. 15 shows a schematic cross-sectional representation of part of a glass bending line 70 incorporating a press bending station 1 of the type shown in FIG. 1, the operation of which is described with reference to FIGS. 1-14.

The glass bending line 70 comprises a heating furnace 72, a press bending section 74, which may be or may not be heated, and an annealing furnace 76.

A roller conveyor bed 78 extends through the heating furnace 72, the press bending section 74 and the annealing furnace 76 to define a path of conveyance for a glass sheet 50. The roller conveyor bed comprises a plurality of rollers 80 configured (i.e. in a spaced apart parallel relationship) to convey a glass sheet 50 in the direction of arrow 82. In this example the glass sheet 50 is shown to be in contact with the rollers 80, but the glass sheet 50 may be positioned on a suitable carriage (not shown), the carriage being in contact with the rollers 80. As an alternative to rollers 80, or in addition to rollers 80, an air flotation device may be used to convey the glass sheet in the direction of arrow 82.

In the heating furnace 72 the glass sheet 50 is heated to a temperature suitable for bending. The furnace may incorporate any suitable heating means such as electric heating, gas heating, convective heating and microwave heating and combinations thereof as required.

Inside the press bending section 74 is press bending station 1. When the glass sheet 50 is conveyed to between the frame 7 and the two part press bending member 6, the glass sheet is positioned onto the frame 7 by being deposited thereon for subsequent press bending as has been described with reference to FIGS. 1-14. Methods are known in the prior art for transferring the glass sheet from the conveyor rollers 80 to the frame 7, for example some of the conveyor rollers may be configured as drop rollers, or a vacuum platen may be used to lift the heat softened glass sheet from the conveyor rollers for depositing onto a suitably configured frame 7.

With reference to FIG. 15 and FIG. 1, the two part press bending member 6 is shown in electrical communication with a control means 84, such as a computer, for controlling the relative movement of the first and second mould members 17, 19 of the two part press bending member 6 by means of the linear actuators 31, 33, 35. The control means 84 may be in electrical communication with other parts of the glass bending line 70, for example the conveyor roller bed 78 to control the speed of the rollers 80 and/or the actuators (not shown) controlling the movement of carrier ring 58.

The carrier ring 58 is shown between the press bending section 74 and annealing furnace 76 and is movable between the position shown in FIG. 9 and the position shown in FIG. 15 by suitable actuators (not shown) i.e. by moving in the direction of arrow 60. A bent glass sheet supported by the carrier ring 58 is moved from being between the two part press bending member 6 and the frame 7 (i.e. inside the press bending section 74), to being outside the press bending section 74, where the bent glass sheet may then be deposited onto portion 78' of the conveyor roller bed 78 to be conveyed into the annealing furnace 76 for subsequent annealing i.e. controlled cooling to ambient temperature.

Although in the figures the two part press bending member 6 is shown as having exposed shaping surfaces 21 and 23 as hereinbefore described, in a preferred embodiment either or both first and second mould member 17, 19 may be provided with a protective cover to protect the shaping surface of the mould member(s) from damage and wear. The lower support 15 may also be provided with such a protective cover to cover the upper shaping surface 15*a*. When a cover is used, preferably the cover comprises a cloth made of, for example, stainless steel, fibre glass, poly-phenyleneterephthalamide fibres (e.g. Kevlar™), materials blended Kevlar™, polybenzoxale (PBO) fibres containing graphite (e.g. Zylon™), or various weaves of these fibres.

If a protective cover is used to cover each shaping surface 21, 23, it is preferred to use a single cover that covers both the shaping surface 21 and the shaping surface 23.

If a protective cover is used that covers both the shaping surfaces 21 and 23, the protective cover should be sufficiently flexible to allow the first and second mould members to move as described hereinbefore.

Furthermore, if a protective cover is used that covers both the shaping surfaces 21 and 23, it is preferred that the protective cover is sufficiently porous or air permeable to allow the provision of a vacuum therethrough, for example at the gap 40 between the first and second mould members, or at any opening that may be in the respective shaping surface of the first and second mould members as has been previously described.

It is possible to use a separate protective cover for each shaping surface 21, 23. This has the advantage that the gap between the first and second mould members may not be impeded by the material of the protective cover.

Figure 16:
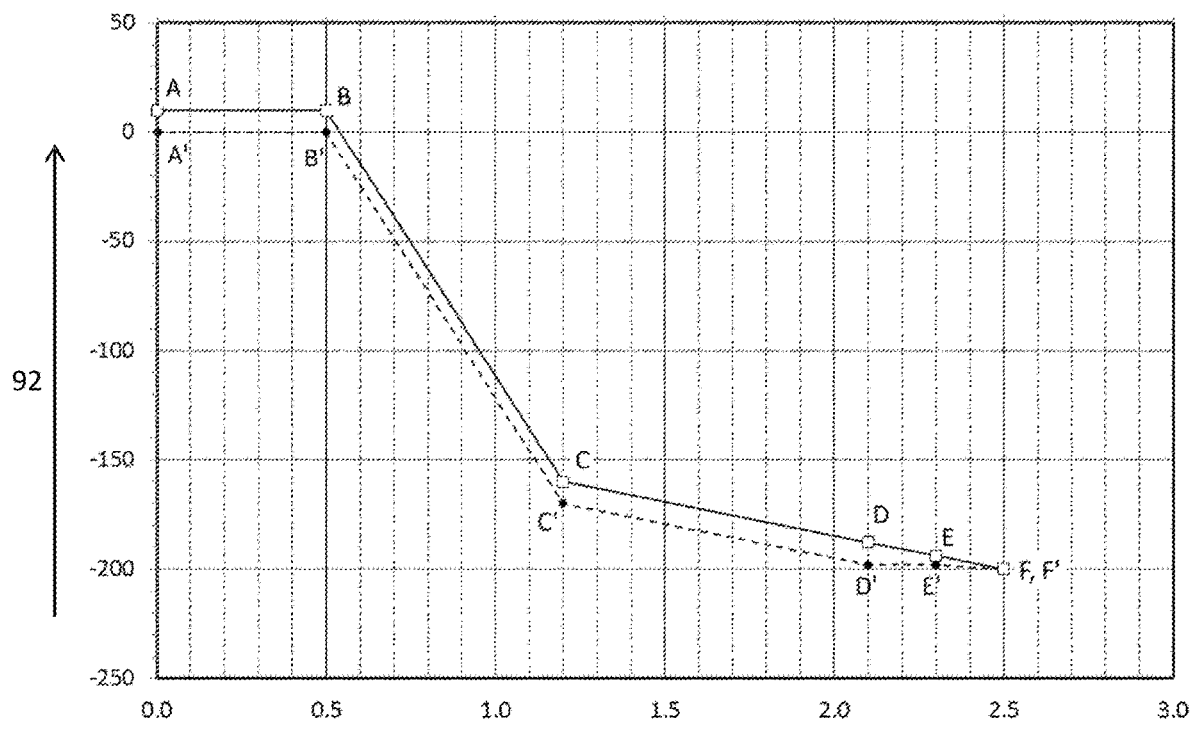
FIG. 16 is a graph showing (for a first embodiment) the variation with time of the vertical position of the shaping surfaces of the first and second parts of a two part press bending member.
Figure 17:
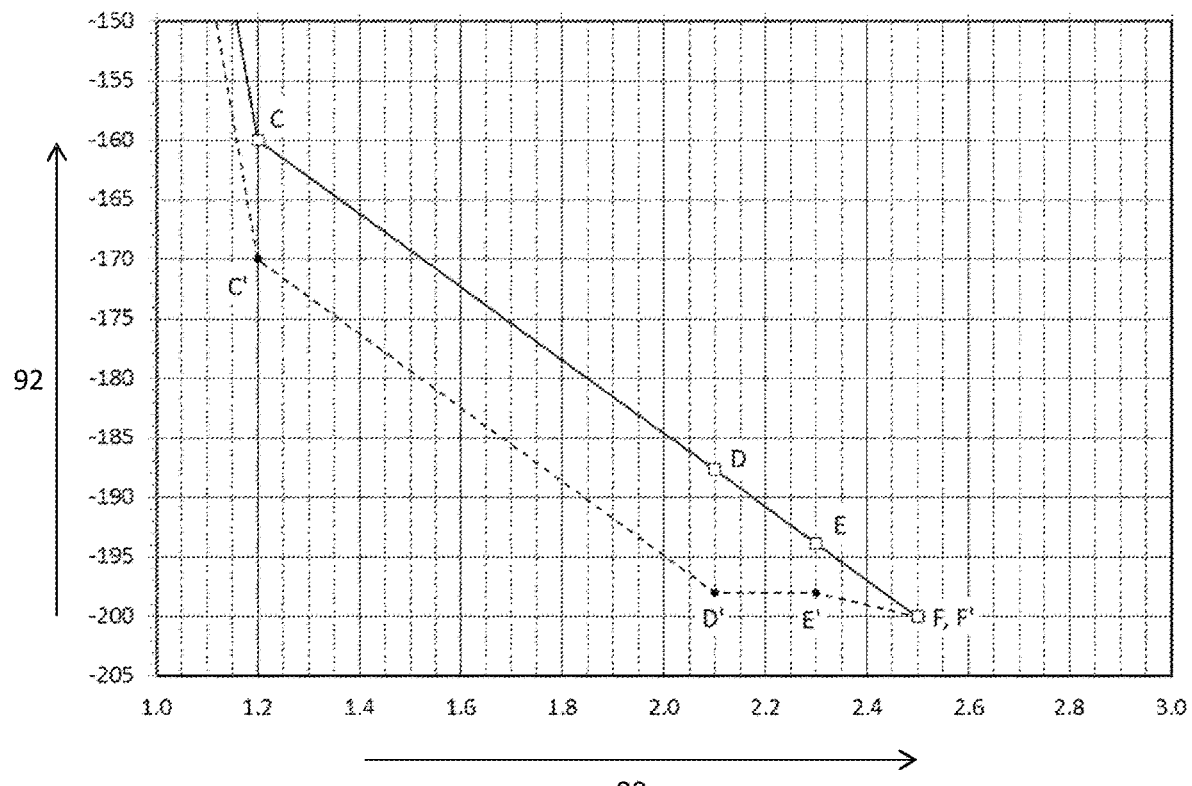
FIG. 17 is a graph showing the variation with time of the vertical position of the shaping surfaces of the first and second parts of a two part press bending member as shown in FIG. 16 but with expanded axes.
Figure 18:
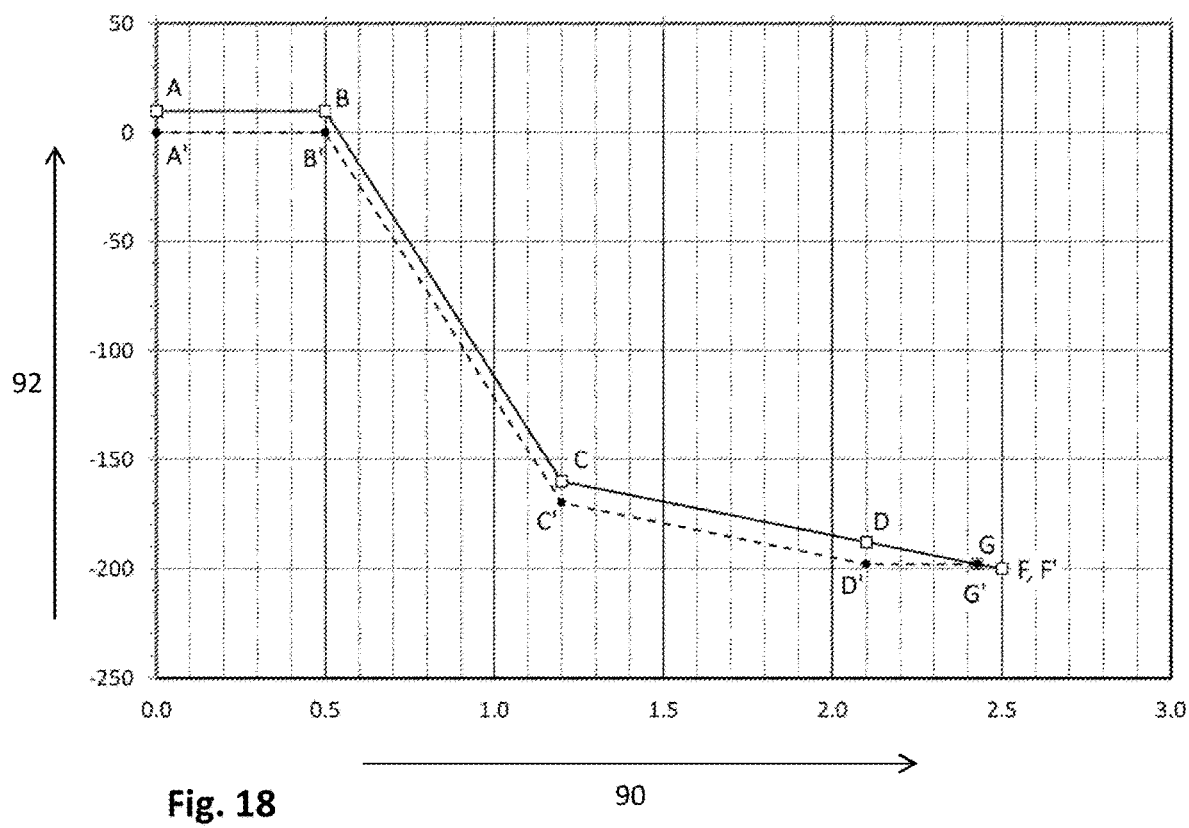
FIG. 18 is a graph showing (for a second embodiment) the variation with time of the vertical position of the shaping surfaces of the first and second parts of a two part press bending member.
Figure 19:
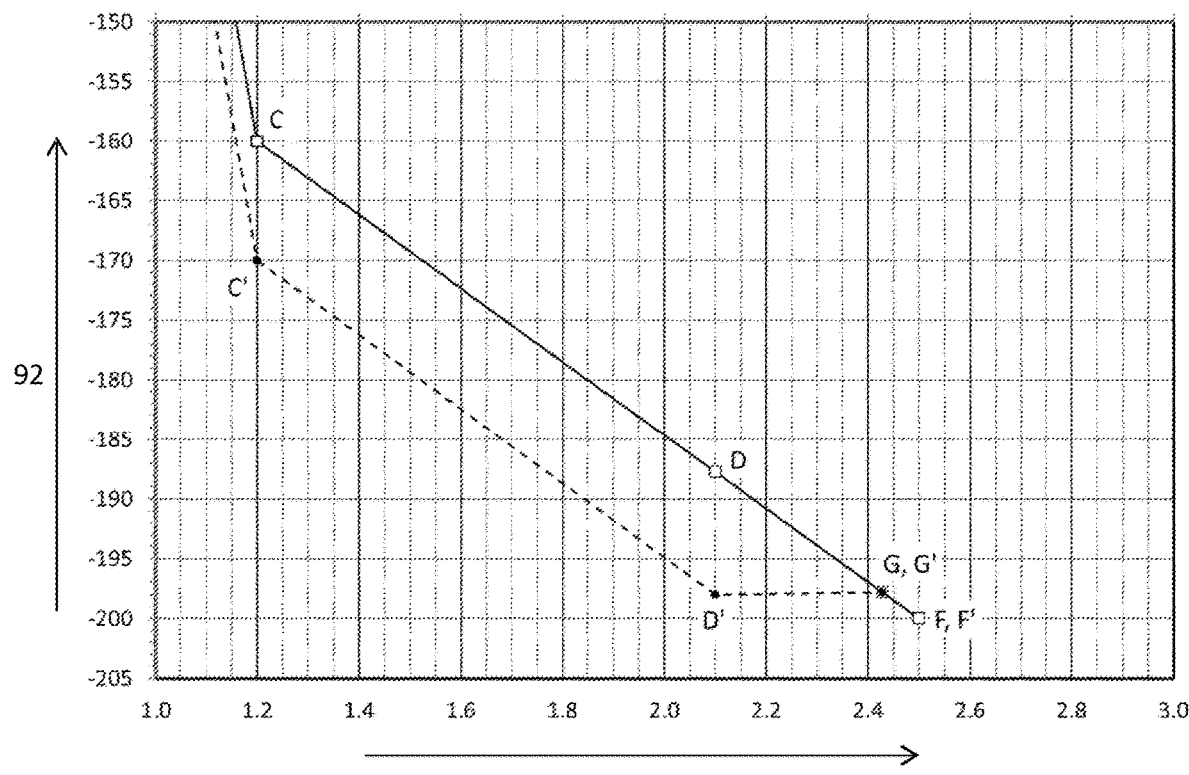
FIG. 19 is a graph showing the variation with time of the vertical position of the shaping surfaces of the first and second parts of a two part press bending member as shown in FIG. 18 but with expanded axes.

The downward movement of the first and second mould members 17, 19 in moving between the configurations shown in FIGS. 1, 6, 7 and 8 (or FIGS. 10-14) is illustrated in FIGS. 16 and 17 (for a first example) and in FIGS. 18 and 19 (for a second example). FIGS. 16-19 show the vertical position of the first and second mould members 17, 19 relative to the final desired position of the shaping surface of said parts represented by line 25 in FIG. 1 and FIG. 5.

In FIGS. 16-19, the axis 90 is time in seconds, and the axis 92 is distance in mm.

In FIGS. 16 and 17, the dotted line represents the vertical displacement of the shaping surface 21 of the first mould member 17 relative to the final desired position of said shaping surface 21. The solid line represents the vertical displacement of the shaping surface 23 of the second mould member 19 relative to the final desired position of said shaping surface 23. The final desired position of the shaping surfaces 21, 23 (when they are aligned, see FIGS. 5, 7 and 13 and the related description thereof) is at a vertical displacement of −200 mm relative to a reference datum point of zero. The shaping surface 21 is at the zero reference datum point at time=zero, and the shaping surface 23 is at +10 mm relative to the zero reference datum point at time=zero. That is, at the final desired position for the shaping surface 21 there has been a total vertical movement downwards of 200 mm, whereas for the shaping surface 23 there has been a total vertical movement downwards of 210 mm.

With reference to FIGS. 16 and 17, the relative movement of the first and second mould members 17, 19 in a first embodiment shall be described.

At time t=0 (i.e. points A and A'), the two part press bending mould 6 is arranged such that the shaping surface 21 of the first mould member 17 is displaced relative to the shaping surface 23 of the second mould member 19 by 10 mm. With reference to FIG. 5 the distance 27 (and hence distance 27', see FIG. 1) is 200 mm, the distance 29 is 210 mm and the displacement 43 is 10 mm.

After 0.5 seconds (at points B, B'), the pressing bending operation begins and both the first mould member 17 and the second mould member 19 move vertically downwards towards the glass sheet 50 supported on the frame 7, see for example FIG. 10. Both the first and second mould members 17, 19 move downwards at the same speed (=v1) so there is no relative movement between the shaping surfaces 21, 23 of the first and second mould members 17, 19 during this downward movement stage i.e. between points B-C and B'-C' the movement of the first and second mould members 17, 19 is synchronised and the displacement 43 remains fixed at 10 mm.

After 1.2 seconds, (at points C, C') the downward speed of the first and second mould members 17, 19 is reduced (to speed v2) as the surface of the glass sheet 50 is approached. Synchronised vertical downward movement of the first and second mould members 17, 19 is continued at speed v2 until point D, D' is reached.

After 2.1 seconds (at point D), the second mould member 19 continues to move vertically downwards at the speed v2. However, at point D' (which coincides in time to point D), the vertical downwards movement of the first mould member 17 is stopped. The press bending station is in the configuration shown in FIG. 6 (or FIG. 12). At this point in time, the major surface 52 of the glass sheet 50 has been contacted by the shaping surface 21 of the first mould member 17 such that the glass sheet 50 is partially pressed between the lower support 15 of the frame 7 and the first mould member 17.

Over the next 0.2 seconds, the second mould member 19 continues to move downwards at speed v2 to press bend the glass sheet 50 in the central region thereof while the glass sheet 50 remains partially pressed by the static first mould member 17. That is, between the point D' and E', the first mould member 17 remains static relative to the frame 7 to partially press the glass sheet in a peripheral region thereof.

After 2.3 seconds (at point E') movement of the first mould member 17 is restarted with a downward speed (=v3) selected such that first mould member 17 and the second mould member 19 both reach the final desired position (at point F, F') at the same time. That is, between the points E and F the second mould member 19 continues to move vertically downwards at speed v2 whilst between the points E' and F' the first mould member moves vertically downwards at speed v3.

The downwards movement of the first mould member 17 between points E' and F' further presses the peripheral region of the glass sheet between the upper shaping surface 15a of the lower support 15 and the shaping surface 21 of the first mould member. That is, in the peripheral region the glass sheet is further pressed between the lower support 15 and the first mould member 17 whilst the glass sheet is further press bent in the central region by the second mould member 19.

It is evident that as the second mould member 19 continues to move vertically downwards between the points D and E, because the first mould member 17 is static between point D' and E' (which correspond to point D and E respectively), the separation of the shaping surfaces 21, 23 of the first and second mould members 17, 19 decreases. With reference to FIG. 5, the displacement 43 decreases in between points D and E.

After 2.5 seconds, (at the points F, F') both the first and second mould members 17, 19 have reached the final desired position and the glass sheet 50 is press bent to the final desired shape. The press bending station is in the configuration shown in FIG. 8 or FIG. 14. At points F, F', the two part bending member 6 has a shaping surface having the final desired curvature.

In this particular example of the method according to the first aspect of the present invention (as illustrated in FIGS. 16 and 17), the initial separation (displacement 43) of the shaping surfaces of the first and second pressing is 10 mm. The first mould member 17 was moved vertically downwards to a position such that the position of the shaping surface 21 was 2 mm away from the final position for the shaping surface 21. The shaping surfaces 21, 23 were then caused to move as described above to reach the final position at the same time indicated by points F, F, which is two seconds after the initial vertical downwards movement of both first and second mould members 17, 19 began i.e. two seconds after the point B, B'.

By stopping the first mould member 17 at point D', and then restarting the downward movement of the first mould member at point E', it was found that further downward movement of the first mould member 17 to move the shaping surface 21 to the final position at the same time that the shaping surface 23 of the second mould member 19 reaches the final position i.e. at points F,F', transient stresses created in the glass sheet 50 during the press bending operation were reduced compared to when the first mould member 17 moves to the final position without stopping beforehand. That is, without the first mould member stopping at point D', but instead continuing at speed v2 until the shaping surface 21 of the first mould member 17 is at the final desired position (i.e. at −200 mm from the zero datum) there was more glass breakage during the press bending operation.

Another test was carried out using a modified downward movement of the first and second mould members 17, 19.

This second example is described with reference to FIGS. 18 and 19. In FIGS. 18 and 19, the dotted line represents the vertical displacement of the shaping surface 21 of the first mould member 17 relative to the final desired position of said shaping surface 21. The solid line represents the vertical displacement of the shaping surface 23 of the second mould member 19 relative to the final desired position of said shaping surface 23. The final desired position of the shaping surfaces 21, 23 (when they are aligned, see FIGS. 5, 7 and 13 and the related description thereof) is at a vertical displacement of −200 mm relative to a reference datum point of zero. The shaping surface 21 is at the zero reference datum point at time=zero, and the shaping surface 23 is at +10 mm relative to the zero reference datum point at time=zero. That is, at the final desired position for the shaping surface 21 there has been a total downwards movement of 200 mm, whereas for the shaping surface 23 that has been a total downwards movement of 210 mm.

In FIGS. 18 and 19, up to the points D, D' (at 2.1 seconds), the movement of the first and second mould members 17, 19 in this second example is the same as in the first example (as illustrated in FIGS. 16 and 17). That is, between point B and C (and B' and C') both the first and second mould members 17, 19 move vertically downwards at a speed of v1 (with the displacement 43 fixed at 10 mm), and between point C and D (and C' and D') both the first and second mould members 17, 19 move vertically downwards at a speed of v2 (again with the displacement 43 fixed at 10 mm).

In this second example at point D, the second mould member 19 continues to move vertically downwards at the same speed v2 until at point F the final position is reached. The second mould member 19 in this second example moves downwards in the same manner as in the first example described in relation to FIGS. 16 and 17.

As in the first example, in the second example when the first mould member reaches point D (after 2.1 seconds) downward movement thereof is stopped. However in contrast to the first example, the first mould member remains static until the shaping surface 21 of the first mould member 17 and the shaping surface 23 of the second mould member are aligned (at point G, G'). With reference to FIG. 5, at the point G, G' the displacement 43 is zero and the shaping surfaces 21, 23 are aligned. The two part press bending member 6 has the final desired shaping surface (represented by dotted line 24 in FIG. 5) but the final desired shaping surface is not in the desired final position (represented by dotted line 25 in FIG. 5).

At this time when the displacement 43 is zero (which is at about 2.43 seconds), at point G' the downward movement of the first mould member 17 is restarted to move the shaping surface 21 of the first mould member and the shaping surface 23 of the second mould member to the final desired position.

Between the points G' and F' the movement of the first and second mould members 17, 19 is again synchronised such that there is no relative vertical movement between the two shaping surfaces 21, 23. The first and second mould members 17, 19 move vertically downwards at the same speed (=v2) until the final position F, F' is reached at vertical distance −200 mm from the zero reference datum point. The shaping surfaces 21, 23 are aligned and the displacement 43 is zero.

The press bending station is then also in the configuration as shown in FIG. 8 (and in FIG. 14) but the relative movement between the first and second mould members during the press bending operation is different compared to the first example of the method (as described above with reference to FIGS. 16 and 17). The second example described above is illustrated in the FIGS. 10-14.

Such a method according to the present invention is particularly useful for bending initially flat glass sheets to a final curvature for use as a curved sheet of glass for automotive use, for example as a ply in a windscreen, or a pane for a sidelight, backlight or rooflight i.e. a sunroof. Two such curved glass sheets may be used in a vehicle windscreen, joined together by at least one ply of adhesive interlayer material such as polyvinyl butyral (PVB).

FIG. 20 shows a schematic side view of another press bending station 1' that is essentially the same as the press bending station 1 as described with reference to FIGS. 1-8 except that there is a single cloth 16 covering the first and second mould members 17, 19 of the two part press bending member 6.

The press bending station 1' is shown in essentially the same configuration as the press bending station 1 in FIG. 8. However because the first and second mould members are covered with a single cloth 16, the shaping surface of the first mould member 17 is covered by the cloth 16 such that the cloth 16 is in direct contact with the major surface 52 of the glass sheet 50. As such, the shaping surface 21 of the first mould member 17 and the shaping surface 23 of the second mould member 19 are in indirect contact with the major surface 52 of the glass sheet 50.

Preferably the cloth 16 is an air-permeable cloth. Preferably the cloth 16 comprises at least one of stainless steel, fibre glass, poly para-phenyleneterephthalamide fibres or blends thereof, polybenzoxazole (PBO) fibres containing graphite, and various weaves of these fibres.

FIG. 21 shows a schematic side view of another press bending station 1" that is essentially the same as the press bending station 1 as described with reference to FIGS. 1-8 except that there is a first cloth 16' covering the first mould member 17 and a second cloth 16" covering the second mould member 19 i.e. the cloth 16' covers the shaping surface 21 of the first mould member 17 and the cloth 16" covers the shaping surface 23 of the second mould member 19. In order to accommodate the two cloth covers, a second mould member 19' is provided that has a slightly smaller shaping surface to accommodate the cloth extending up the outer peripheral wall 18a and the inner peripheral wall 18b of the first mould member 17 and the outer peripheral wall 20 of the second mould member 19'. As such the gaps 39', 41' are slightly wider than the gaps 39, 41 of FIG. 1. Also because two cloths 16', 16" are used, the gaps 39' and 41' are not impeded by cloth in the vicinity of the shaping surface of the two part press bending member 106 (designated as 106 because the second mould member 19' is different to the second mould member 19 of the two part press bending member 6). The use of two or more cloths also provides an advantage in that only selected regions of the cloth may be replaced as the cloth wears due to continued use in bending glass sheets. Whilst using a single cloth requires the whole cloth to be replaced if the cloth wears, when using at least a first and second cloth, only one of the cloths may be replaced as required.

The press bending station 1" is shown in essentially the same configuration as the press bending station 1 in FIG. 8. However because the first mould member 17 is covered with the cloth 16' and the second mould member 19' is covered with the cloth 16", the cloths 16' and 16" are in direct contact with the first major surface 52 of the glass sheet 50. As such, the shaping surface 21 of the first mould member 17 and the shaping surface 23 of the second mould member 19 are in indirect contact with the first major surface 52 of the glass sheet 50 via cloths 16' and 16" respectively.

Preferably at least one of the cloths 16', 16" is an air-permeable cloth. Preferably the cloth 16' and/or 16" comprises at least one of stainless steel, fibre glass, poly para-phenyleneterephthalamide fibres or blends thereof, polybenzoxazole (PBO) fibres containing graphite, and various weaves of these fibres.

It was found that when using a method of shaping a glass sheet according to the present invention, as well as improving the wrinkle in a peripheral region of the bent glass sheet (in comparison to using a single unitary upper press bending member) the risk of glass breakage during the shaping operation i.e. the press bending operation, was reduced.

Although the examples provided herein only relate to a two part press bending member, the press bending apparatus may comprise a press bending member have three or more independently moveable mould members, for example two opposing lateral peripheral regions of the glass sheet may be pressed during step (v) and during step (vi) a central region of the glass sheet between the two opposing lateral peripheral regions of the glass sheet may be pressed.

The invention claimed is:

1. A method of shaping a glass sheet using a shaping support and a press bending apparatus comprising at least two mould members, the at least two mould members being a first mould member and a second mould member, each of the first and second mould members being movable relative to the shaping support, the method comprising:
   (i) heating the glass sheet;
   (ii) positioning the glass sheet on a shaping support;
   (iii) moving at least one of the shaping support and the press bending apparatus toward the other to press the glass sheet in a first region of the glass sheet between the shaping support and the first mould member;
   (iv) moving the second mould member relative to the first mould member to press the glass sheet in a second region of the glass sheet, and
   (v) moving the first mould member relative to the shaping support to further press the glass sheet in the first region of the glass sheet between the first mould member and the shaping support,
   wherein steps (i) to (v) are performed in the stated order, and
   wherein the first region of the glass sheet is a peripheral region of the glass sheet and wherein the second region of the glass sheet is a central region of the glass sheet.

2. A method according to claim 1, wherein prior to the moving of at least one of the shaping support and the press bending apparatus toward the other, or during the moving of the at least one of the shaping support and the press bending apparatus toward the other, the press bending apparatus contacts the glass sheet in the second region of the glass sheet.

3. A method according to claim 1 wherein during the moving of the first mould member relative to the shaping support, the second mould member moves relative to the shaping support to further press bend the glass sheet in the second region of the glass sheet.

4. A method according to claim 3, wherein: during the moving of the first mould member relative to the shaping support step, the second mould member also moves relative to the first mould member; or during the moving of the first mould member relative to the shaping support step, the movement of the first and second mould members relative to the shaping support is synchronised.

5. A method according to claim 1, wherein the shaping support comprises at least one rail for supporting the glass sheet about a peripheral region thereof and wherein during the moving of the at least one of the shaping support and the press bending apparatus toward the other, the glass sheet is pressed between the first mould member and the shaping support in a peripheral region.

6. A method according to claim 1, wherein during the moving of the second mould member relative to the first mould member to press the second region of the glass sheet, the glass sheet is pressed in a central region of the glass sheet whilst the glass sheet is pressed between the first mould member and the shaping support.

7. A method according to claim 1, wherein the first mould member has a shaping surface and the glass sheet faces the shaping surface of the first mould member during the moving of the at least one of the shaping support and the press bending apparatus toward the other, the first mould member including at least one opening in the shaping surface of the first mould member, the at least one opening in the shaping surface of the first mould member being in fluid communication with at least one vacuum source, the at least one vacuum source being operable to provide at least one negative pressure region at a portion of the first region of the glass sheet after the moving of the first mould member relative to the shaping support, and/or wherein the at least one opening in the shaping surface of the first mould member is in fluid communication with at least one source of fluid such that the fluid may be caused to flow through the at least one opening in the shaping surface of the first mould member after the moving of the first mould member relative to the shaping support.

8. A method according to claim 1, wherein the second mould member has a shaping surface and the glass sheet faces the shaping surface of the second mould member during the moving of the second mould member relative to the first mould member, the second mould member including at least one opening in the shaping surface of the second mould member, the at least one opening in the shaping surface of the second mould member being in fluid communication with at least one vacuum source, the at least one vacuum source being operable to provide at least one negative pressure region at a portion of the second region of the glass sheet after the moving of the first mould member relative to the shaping support and/or wherein the at least one opening in the shaping surface of the second mould member is in fluid communication with at least one source of fluid such that the fluid may be caused to flow through the at least one opening in the shaping surface of the second mould member after the moving of the first mould member relative to the shaping support.

9. A method according to claim 1, wherein the press bending apparatus is configured such there is at least a first gap between the first and second mould members, further wherein the first gap is in fluid communication with at least one vacuum source, the at least one vacuum source being operable to provide at least one negative pressure region at a portion of the glass sheet opposite the first gap, the portion of the glass sheet opposite the first gap being between the first and second regions of the glass sheet and/or wherein the first gap is in fluid communication with at least one source of fluid such that the fluid may be caused to flow through the first gap after the moving of the first mould member relative to the shaping support.

10. A method according to claim 1, wherein the first mould member has a mould member cover such that during the moving of the at least one of the shaping support and the press bending apparatus toward the other the mould member cover of the first mould member is between the first mould member and the glass sheet and/or wherein the second mould member has a mould member cover such that during the moving of the second mould member relative to the first mould member the mould member cover of the second mould member is between the second mould member and the glass sheet.

11. A method according to claim 1, wherein during the moving of the first mould member relative to the shaping support the second mould member is moved by more than 2 mm relative to the first mould member, and/or wherein the first mould member has a shaping surface facing the shaping support and the second mould member has a shaping surface facing the shaping support, and before the moving of the at least one of the shaping support and the press bending apparatus toward the other the press bending apparatus is configured such that the shaping surfaces of the first and second mould members are displaced from one another by more than 2 mm.

12. A method according to claim 1, wherein following the moving of the first mould member relative to the shaping support the glass sheet is thermally toughened by quenching the glass sheet with jets of cooling fluid directed towards at least one major surface of the glass sheet, and/or wherein following the moving of the first mould member relative to the shaping support the glass sheet is laminated to another glass sheet using an interlayer structure comprising at least one sheet of interlayer material.

13. A method according to claim 1, wherein the first mould member is an annular ring, and/or wherein the second mould member is a unitary mould that is disposed at least partially within the first mould member, and/or wherein the second mould member is radially disposed within the first mould member.

* * * * *